(12) United States Patent
Arai et al.

(10) Patent No.: US 12,264,099 B2
(45) Date of Patent: Apr. 1, 2025

(54) GLASS FOR MEDICINE CONTAINER, AND MEDICINE CONTAINER GLASS TUBE AND MEDICINE CONTAINER USING SAME

(71) Applicant: Nippon Electric Glass Co., Ltd., Shiga (JP)

(72) Inventors: Satoshi Arai, Shiga (JP); Masato Kakuma, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 864 days.

(21) Appl. No.: 17/294,140

(22) PCT Filed: Dec. 24, 2019

(86) PCT No.: PCT/JP2019/050572
§ 371 (c)(1),
(2) Date: May 14, 2021

(87) PCT Pub. No.: WO2020/138063
PCT Pub. Date: Jul. 2, 2020

(65) Prior Publication Data
US 2021/0371324 A1  Dec. 2, 2021

(30) Foreign Application Priority Data

Dec. 27, 2018 (JP) .................... 2018-244220
Aug. 1, 2019 (JP) .................... 2019-142104

(51) Int. Cl.
*C03C 3/093* (2006.01)
*A61J 1/06* (2006.01)
*A61J 1/14* (2023.01)
*B65D 1/02* (2006.01)
*C03C 3/087* (2006.01)
*C03C 4/20* (2006.01)

(52) U.S. Cl.
CPC .............. *C03C 3/093* (2013.01); *A61J 1/065* (2013.01); *A61J 1/1468* (2015.05); *B65D 1/0207* (2013.01); *C03C 3/087* (2013.01); *C03C 4/20* (2013.01); *C03C 2204/00* (2013.01)

(58) Field of Classification Search
CPC ........... C03C 3/087; C03C 3/091; C03C 4/20; B65D 1/0207; A61J 1/065; A61J 1/1468
See application file for complete search history.

(56) References Cited

U.S. PATENT DOCUMENTS

| | | | |
|---|---|---|---|
| 2011/0098172 A1 | 4/2011 | Brix | |
| 2012/0183812 A1* | 7/2012 | Kajita | C03C 3/087 501/71 |
| 2013/0101596 A1 | 4/2013 | DeMartino et al. | |
| 2013/0101853 A1* | 4/2013 | Drake | C03C 4/20 428/410 |
| 2013/0196094 A1 | 8/2013 | Weeks et al. | |
| 2013/0196095 A1 | 8/2013 | Weeks et al. | |
| 2013/0196096 A1 | 8/2013 | Weeks et al. | |
| 2013/0196097 A1 | 8/2013 | Weeks et al. | |
| 2013/0202823 A1 | 8/2013 | Weeks et al. | |
| 2013/0213848 A1 | 8/2013 | Weeks et al. | |
| 2013/0216742 A1 | 8/2013 | DeMartino et al. | |
| 2015/0344350 A1 | 12/2015 | Drake et al. | |
| 2015/0366756 A1 | 12/2015 | Weeks et al. | |
| 2015/0374582 A1 | 12/2015 | Weeks et al. | |
| 2016/0095795 A1 | 4/2016 | Weeks et al. | |
| 2016/0095796 A1 | 4/2016 | Weeks et al. | |
| 2016/0107924 A1 | 4/2016 | Yamamoto et al. | |
| 2017/0327407 A1 | 11/2017 | Drake et al. | |
| 2018/0265401 A1 | 9/2018 | Yamamoto et al. | |
| 2018/0354842 A1 | 12/2018 | Kato et al. | |
| 2020/0140319 A1 | 5/2020 | Drake et al. | |

FOREIGN PATENT DOCUMENTS

| | | |
|---|---|---|
| JP | 2011-093792 | 5/2011 |
| JP | 2015-13793 | 1/2015 |
| JP | 2017-218353 | 12/2017 |
| WO | 2013/063002 | 5/2013 |
| WO | 2013/063275 | 5/2013 |
| WO | 2013/063280 | 5/2013 |
| WO | 2013/063283 | 5/2013 |
| WO | 2013/063287 | 5/2013 |
| WO | 2013/063290 | 5/2013 |
| WO | 2013/063292 | 5/2013 |
| WO | WO-2014025009 A1 * 2/2014 ........... C03C 21/002 |
| WO | 2014/196655 | 12/2014 |
| WO | 2017/110927 | 6/2017 |

OTHER PUBLICATIONS

International Preliminary Report of Patentability and Written Opinion of the International Searching Authority issued Jun. 16, 2021 in International (PCT) Application No. PCT/JP2019/050572.
International Search Report issued Mar. 17, 2020 in International (PCT) Application No. PCT/JP2019/050572.

* cited by examiner

Primary Examiner — Elizabeth A. Bolden
(74) Attorney, Agent, or Firm — Wenderoth, Lind & Ponack, L.L.P.

(57) ABSTRACT

The present invention provides a glass for a pharmaceutical container, which includes as a glass composition, in terms of mol %, 69% to 81% of $SiO_2$, 4% to 12% of $Al_2O_3$, 0% to 5% of $B_2O_3$, 5% to 20% of $Li_2O+Na_2O+K_2O$, 0% to 12% of $Li_2O$, 0% to 11% of $Na_2O$, 0.01% to 11% of $MgO+CaO+SrO+BaO$, and 0.01% to 11% of CaO, which satisfies the following relationship: a molar ratio MgO/CaO<9.0, and which has a working point of 1,270° C. or less.

19 Claims, No Drawings

GLASS FOR MEDICINE CONTAINER, AND MEDICINE CONTAINER GLASS TUBE AND MEDICINE CONTAINER USING SAME

TECHNICAL FIELD

The present invention relates to a glass for a pharmaceutical container excellent in processability and hydrolytic resistance, and a glass tube for a pharmaceutical container and a pharmaceutical container each using the same.

BACKGROUND ART

Various glass containers have hitherto been used as containers in which pharmaceuticals are filled and stored. While the pharmaceuticals are roughly divided into two kinds of drugs: an oral drug and a parenteral drug, in particular, the parenteral drug is filled and stored in a glass container and directly administered to blood of a patient, and hence the glass container is required to have significantly high quality.

In addition, pharmaceutical containers are required not to alter components of a drug filled therein. When glass components are eluted into the drug, the glass components may alter the properties of the drug, and affect the health of a patient and even the life of the patient. Accordingly, the pharmacopoeias of various countries have limits for the elution amounts of the glass components from a glass for a pharmaceutical container.

In view of the foregoing, as a glass material that satisfies the standard for the components eluted from the glass, a borosilicate glass containing $B_2O_3$ in a large amount is used. A currently-used borosilicate glass for a pharmaceutical container generally contains $SiO_2$, $Al_2O_3$, $B_2O_3$, $Na_2O$, $K_2O$, CaO, BaO, and a fining agent in a small amount.

In recent years, drugs having high drug efficacy have been developed through advances in medical sciences and pharmaceutical sciences. When such drug is filled and stored in a glass container formed of the related-art borosilicate glass, a phenomenon called delamination, in which an inside surface of the glass container is corroded, and is peeled off and floats as flakes in the drug, poses a serious problem. This is because, when insoluble foreign matter generated through the delamination or the like is injected into a body of a patient with the drug, there is a risk in that the foreign matter may be harmful to a human body owing to, for example, formation of a thrombus in a blood vessel.

CITATION LIST

Patent Literature 1: WO 2013/063275 A1

SUMMARY OF INVENTION

Technical Problem

In view of the foregoing, as a countermeasure against the delamination, a glass described in Patent Literature 1 has been developed. The glass described in Patent Literature 1, which is called an aluminosilicate glass, is designed to hardly cause delamination by reducing the content of $B_2O_3$. Meanwhile, the glass has a high viscosity, and is inferior in processability into a pharmaceutical container, such as an ampoule, a vial, a pre-filled syringe, or a cartridge. Further, a processing temperature at the time of processing is required to be increased, and hence components contained in the glass are liable to vaporize during the processing, and may contaminate an inside surface of the container. In addition, the glass cannot be said to be sufficient also in terms of hydrolytic resistance.

A technical object of the present invention is to propose a glass for a pharmaceutical container, which is excellent in processability into a pharmaceutical container, such as an ampoule, a vial, a pre-filled syringe, or a cartridge, and further, hardly causes delamination or generates insoluble foreign matter, and is excellent in hydrolytic resistance, and a glass tube and a pharmaceutical container each using the same.

Solution to Problem

The inventor of the present invention has made various investigations, and as a result, has found that the above-mentioned object can be achieved by restricting the contents of constituent components of a glass, and setting the working point of the glass to 1,270° C. or less. Thus, the finding is proposed as the present invention.

That is, according to one embodiment of the present invention, there is provided a glass for a pharmaceutical container, which comprises as a glass composition, in terms of mol %, 69% to 81% of $SiO_2$, 4% to 12% of $Al_2O_3$, 0% to 5% of $B_2O_3$, 5% to 20% of $Li_2O+Na_2O+K_2O$, 0% to 12% of $Li_2O$, 0% to 11% of $Na_2O$, 0.01% to 11% of $MgO+CaO+SrO+BaO$, and 0.01% to 11% of CaO, which satisfies the following relationship: a molar ratio MgO/CaO<9.0, and which has a working point of 1,270° C. or less. Herein, the "$Li_2O+Na_2O+K_2O$" means the total of the contents of $Li_2O$, $Na_2O$, and $K_2O$. The "MgO+CaO+SrO+BaO" means the total of the contents of MgO, CaO, SrO, and BaO. In addition, the "MgO/CaO" refers to a value obtained by dividing the content of MgO by the content of CaO. Further, the "working point" means a temperature at which the glass has a viscosity of $10^{4.0}$ dPa·s.

The inventor of the present invention has ascertained that, when a drug is filled and stored in a glass container, a Mg ion eluted from the glass may react with hydrated silicic acid generated on the surface of the glass to form an insoluble hydrated magnesium silicate film. The insoluble foreign matter is formed on an inside wall of the container, is peeled off therefrom by vibration or the like to become flake-like insoluble foreign matter, and may be mixed in the drug. Moreover, the insoluble foreign matter mixed in the drug in this manner may form a thrombus in the body of a patient, as in the case of delamination described above. The glass for a pharmaceutical container according to the one embodiment of the present invention, in which the content of $B_2O_3$ and the molar ratio MgO/CaO are restricted, hardly causes the delamination and hardly generates the insoluble foreign matter. In addition, the glass composition and the working point of the glass are restricted as described above, and hence both satisfactory processability and excellent hydrolytic resistance can be achieved. Consequently, a pharmaceutical container that hardly causes the delamination or generates the insoluble foreign matter, and is excellent in hydrolytic resistance can be easily manufactured.

In addition, it is preferred that the glass for a pharmaceutical container according to the one embodiment of the present invention satisfy the following relationship: the molar ratio MgO/CaO≤1.0. With this configuration, the risk of forming the insoluble foreign matter can be further reduced. In addition, excellent processability and hydrolytic resistance can be further improved. As a result, a pharmaceutical container that is more excellent in safety, and is more excellent in hydrolytic resistance can easily be obtained.

In addition, it is preferred that the glass for a pharmaceutical container according to the one embodiment of the present invention have a content of $Li_2O$ of from 0.1 mol % to 12 mol %.

With this configuration, excellent processability can be imparted to the glass, and the glass can easily be processed into a complex shape.

It is preferred that the glass for a pharmaceutical container according to the one embodiment of the present invention have a value for a molar ratio $CaO/Li_2O$ of from more than 0 to 10,000. Herein, the "$CaO/Li_2O$" refers to a value obtained by dividing the content of CaO by the content of $Li_2O$.

With this configuration, the glass, which has excellent processability, and also has hydrolytic resistance required for a pharmaceutical container, can be easily obtained.

It is preferred that the glass for a pharmaceutical container according to the one embodiment of the present invention have a value for a molar ratio $Li_2O/(NA_2O+K_2O)$ of from 0 to 4.0. Herein, the "$Li_2O/(Na_2O+K_2O)$" refers to a value obtained by dividing the content of $Li_2O$ by the total of the contents of $Na_2O$ and $K_2O$.

With this configuration, while the hydrolytic resistance and devitrification resistance are maintained, the viscosity of the glass can be reduced to improve the processability.

It is preferred that the glass for a pharmaceutical container according to the one embodiment of the present invention comprise as the glass composition, in terms of mol %, 0% to 5% of MgO, 1% to 4% of CaO, 0% to 4% of SrO, and 0% to 4% of BaO.

It is preferred that the glass for a pharmaceutical container according to the one embodiment of the present invention have a content of $B_2O_3$ of from 0.01 mol % to 4 mol %.

With this configuration, while the occurrence of the delamination is suppressed, satisfactory processability can be obtained.

In addition, it is preferred that the glass for a pharmaceutical container according to the one embodiment of the present invention have a content of $Al_2O_3$ of from more than 8 mol % to 12 mol %.

With this configuration, the hydrolytic resistance can be further improved.

In addition, it is preferred that the glass for a pharmaceutical container according to the one embodiment of the present invention satisfy the following relationship: a molar ratio $Al_2O_3/(Li_2O+Na_2O+K_2O) \geq 0.52$ Herein, the "$Al_2O_3/(Li_2O+Na_2O+K_2O)$" refers to a value obtained by dividing the content of $Al_2O_3$ by the total of the contents of $Li_2O$, $Na_2O$, and $K_2O$.

With this configuration, while the processability is maintained, the hydrolytic resistance can be further improved.

In addition, it is preferred that the glass for a pharmaceutical container according to the one embodiment of the present invention have a content of MgO+CaO+SrO+BaO of from 1 mol % to 5 mol %. Herein, the "MgO+CaO+SrO+BaO" refers to the total of the contents of MgO, CaO, SrO, and BaO.

With this configuration, both satisfactory processability and excellent hydrolytic resistance can be easily achieved, and further, the devitrification resistance can easily be maintained.

In addition, according to one embodiment of the present invention, there is provided a glass for a pharmaceutical container, which comprises as a glass composition, in terms of mol %, 69% to 81% of $SiO_2$, 4% to 8% of $Al_2O_3$, 0% to 5% of $B_2O_3$, 5% to 16.4% of $Li_2O+Na_2O+K_2O$, 0.1% to 11% of $Na_2O$, 0.01% to 11% of MgO+CaO+SrO+BaO, and 0.01% to 4% of CaO, which satisfies the following relationship: a molar ratio MgO/CaO<1.0, which has a value for a molar ratio $CaO/Li_2O$ of from more than 0 to 10,000, and which has a working point of 1,270° C. or less.

In addition, according to one embodiment of the present invention, there is provided a glass for a pharmaceutical container, which comprises as a glass composition, in terms of mol %, 69% to 81% of $SiO_2$, more than 8% to 12% of $Al_2O_3$, 0% to 5% of $B_2O_3$, 3.2% to 12% of $Li_2O$, 0.1% to 11% of $Na_2O$, and 0.01% to 11% of CaO, which satisfies the following relationship: a molar ratio MgO/CaO<1.0, and which has a value for $Al_2O_3/(Li_2O+Na_2O+K_2O)$ of from 0.52 to 1.10.

In addition, according to one embodiment of the present invention, there is provided a glass for a pharmaceutical container, which comprises as a glass composition, in terms of mol %, 69% to 81% of $SiO_2$, 4% to 8% of $Al_2O_3$, 0% to 5% of $B_2O_3$, 5% to 14% of $Li_2O+Na_2O+K_2O$, 0.1% to 11% of $Na_2O$, 0.1% to 11% of MgO+CaO+SrO+BaO, and 0.1% to 4% of CaO, which satisfies the following relationship: a molar ratio MgO/CaO<1.0, which has a value for a molar ratio $CaO/Li_2O$ of from more than 0 to 10,000, and which has a value for a molar ratio $Al_2O_3/(Li_2O+Na_2O+K_2O)$ of from 0.3 to 0.5.

It is preferred that the glass for a pharmaceutical container according to the embodiments of the present invention have a working point of 1,260° C. or less.

In addition, it is preferred that the glass for a pharmaceutical container according to the embodiments of the present invention be classified as at least HGA 1 in a hydrolytic resistance test (washing with acetone) in conformity with ISO 720.

In the present invention, the "hydrolytic resistance test (washing with acetone) in conformity with ISO 720" refers to the following test.

(1) A glass sample is pulverized in an alumina motor and classified into a particle diameter of from 300 μm to 425 μm with a sieve.

(2) The resultant powder sample is washed with acetone and dried in an oven at 140° C.

(3) 10 g of the powder sample after the drying is loaded into a quartz flask, 50 mL of purified water is further added thereto, and the flask is covered with a closure, followed by treatment in an autoclave. The treatment is performed under the following treatment conditions: a temperature is increased at a rate of 1° C./min from 100° C. to 121° C., is then retained at 121° C. for 30 minutes, and is reduced at a rate of 0.5° C./min to 100° C.

(4) After the treatment in an autoclave, the solution in the quartz flask is transferred to another beaker, the inside of the quartz flask is further washed with 15 mL of purified water three times, and also the washing liquid is added to the beaker.

(5) A methyl red indicator is added to the beaker, and the content is titrated with a 0.02 mol/L hydrochloric acid aqueous solution.

(6) The amount of the hydrochloric acid aqueous solution is converted to an alkali elution amount per gram of glass on the assumption that 1 mL of the 0.02 mol/L hydrochloric acid aqueous solution corresponds to 620 μg of $Na_2O$.

The "classified as at least HGA 1 in a hydrolytic resistance test (washing with acetone) in conformity with ISO 720" means that the alkali elution amount per gram of glass in terms of $Na_2O$ determined through the above-mentioned test is 62 μg/g or less.

In addition, it is preferred that the glass for a pharmaceutical container according to the embodiments of the present invention have an alkali elution amount of 60 μg/g or less in a hydrolytic resistance test (washing with acetone) in conformity with ISO 720.

It is preferred that a glass tube for a pharmaceutical container according to one embodiment of the present invention comprise the above-mentioned glass for a pharmaceutical container.

It is preferred that a pharmaceutical container according to one embodiment of the present invention comprise the above-mentioned glass for a pharmaceutical container. The glass for a pharmaceutical container according to the embodiments of the present invention has high hydrolytic resistance. Further, a processing temperature can be reduced, and hence the vaporization amounts of glass components during processing can be reduced, with the result that the contamination of the inside surface of the container can easily be suppressed. As a result, the pharmaceutical container, which is excellent in hydrolytic resistance and excellent even in chemical durability, can easily be obtained.

DESCRIPTION OF EMBODIMENTS

The reasons why the composition ranges of components are limited are described. In the following description, the expression "%" means "mold" unless otherwise specified.

$SiO_2$ is one of components that form a network structure of a glass. When the content of $SiO_2$ is too small, it becomes difficult to vitrify the glass. In addition, a thermal expansion coefficient is increased, and thermal shock resistance is liable to be reduced. Meanwhile, when the content of $SiO_2$ is too large, a liquidus temperature is increased, and the glass is liable to devitrify. Accordingly, the content of $SiO_2$ is from 69% to 81%, preferably from 70% to 80%, from 71% to 79%, from 71% to 78%, from 72% to 78%, or from 72% to 77%, particularly preferably from 73% to 76%.

$Al_2O_3$ is one of the components that form the network structure of the glass, and has an effect of improving the hydrolytic resistance of the glass. When the content of $Al_2O_3$ is too small, the hydrolytic resistance is liable to be degraded. Meanwhile, when the content of $Al_2O_3$ is too large, a viscosity is increased. Accordingly, the content of $Al_2O_3$ is from 4% to 12%, preferably from more than 4% to 11%, or from 4.5% to 10%, more preferably from 5% to 9%, still more preferably from 5.5% to 8%, most preferably from 6% to 8%. In addition, when an improvement in hydrolytic resistance is emphasized, the content of $Al_2O_3$ is preferably from 6% to 12%, from 6.5% to 12%, from 7% to 12%, from 7.5% to 11.5%, from 8% to 11%, from 8% to 10.5%, or from 8% to 10%, particularly preferably from more than 8% to 10%.

$B_2O_3$ has an effect of reducing the viscosity of the glass to improve meltability and processability. However, $B_2O_3$ is considered as one of factors for causing delamination, and when the content thereof is too large, delamination resistance is degraded, and flakes are liable to be generated. Accordingly, the content of $B_2O_3$ is from 0% to 5%, preferably from 0.01% to 4%, from 0.02% to 3%, from 0.03% to 2%, or from 0.04% to 1%, particularly preferably from 0.05% to 0.5%.

$Li_2O$, $Na_2O$, and $K_2O$, which are alkali metal oxides ($R_2O$), each have an effect of reducing the viscosity of the glass to improve the processability and the meltability. However, when the total of the contents of those components is too large, the hydrolytic resistance of the glass is degraded, or the thermal expansion coefficient is increased, and the thermal shock resistance is reduced. Accordingly, the total of the contents of $R_2O$ is from 5% to 20%, preferably from 5% to 17%, from 6% to 16.4%, from 6.5% to 16%, from 7% to 15.5%, or from 7.5% to 15%, still more preferably from 8% to 14.5%, most preferably from 9% to 14%. In addition, when the content of $Al_2O_3$ is increased with more emphasis on the hydrolytic resistance, the total of the contents of $R_2O$ is preferably set to from 5% to 16.40, from 5.5% to 16%, from 6% to 15.5%, or from 6.5% to 15%, particularly from 7% to 14.5%, or from 7.5% to 14%. With this configuration, while preferred hydrolytic resistance is maintained, the processability and the meltability can be improved more.

As described above, $Li_2O$ has an effect of reducing the viscosity of the glass to improve the processability and the meltability. However, when the content of $Li_2O$ is too large, there is a risk in that devitrification resistance and the hydrolytic resistance may be degraded. Accordingly, the content of $Li_2O$ is from 0% to 12%, preferably from more than 0% to 11%, from 0.1% to 10%, from 0.5% to 9%, from 1% to 8.80, from 1.5% to 8.50, from 2% to 8.30, from 2.5% to 80, from 3% to less than 80, from 3.1% to 7.50, from 3.2% to 70, or from 4% to 70, particularly preferably from more than 4% to less than 7%.

As with $Li_2O$, $Na_2O$ has an effect of reducing the viscosity of the glass to improve the processability and the meltability. However, when the content of $Na_2O$ is too large, there is a risk in that the devitrification resistance and the hydrolytic resistance may be degraded. In addition, when the content of $Na_2O$ is too small, the devitrification resistance is reduced in some cases.

Accordingly, the content of $Na_2O$ is from 0% to 15%, preferably from more than 0% to 13%, from 0.1% to 11%, from 0.5% to 10%, from 0.8% to 9.5%, from 1% to 9%, from 1.5% to 8.5%, from 2% to 8.3%, from 2.5% to 8%, from 3% to 7.9%, from 3.2% to 7.5%, or from 3.5% to 7%, particularly preferably from 4% to 7%.

As with $Li_2O$ and $Na_2O$, $K_2O$ has an effect of reducing the viscosity of the glass to improve the processability and the meltability. However, when the content of $K_2O$ is too large, the hydrolytic resistance is degraded. Accordingly, the upper limit of the content of $K_2O$ is preferably 11% or less, 10.5% or less, 10% or less, 8% or less, 6% or less, 5.5% or less, 5% or less, 4.5% or less, 4.3% or less, 4% or less, 3.5% or less, 3.3% or less, 3.2% or less, or 3.1% or less, particularly preferably 3% or less. Meanwhile, when the content of $K_2O$ is too small, the devitrification resistance is reduced in some cases. Accordingly, the lower limit of the content of $K_2O$ is preferably 0% or more, more than 0%, 0.1% or more, 0.5% or more, 0.6% or more, 0.8% or more, 0.9% or more, 1% or more, 1.1% or more, 1.2% or more, 1.3% or more, 1.4% or more, 1.5% or more, 1.6% or more, 1.7% or more, 1.8% or more, 1.9% or more, 2% or more, 2.1% or more, 2.2% or more, 2.3% or more, 2.4% or more, 2.5% or more, or 2.6% or more, particularly preferably 2.7% or more.

Among the above-mentioned alkali metal oxides ($R_2O$), $Li_2O$ has the highest effect of reducing the viscosity of the glass, and the effect of reducing the viscosity of the glass becomes lower in the order of $Na_2O$ and $K_2O$. Accordingly, from the viewpoint of reducing the viscosity of the glass with emphasis on the processability, it is preferred that the following relationship be established among their contents: $Li_2O \geq Na_2O$ (particularly $Li_2O > Na_2O$), $Li_2O \geq K_2O$ (particularly $Li_2O > K_2O$), or $Na_2O \geq K_2O$. It is more preferred that the following relationship be established: $Li_2O \geq Na_2O \geq K_2O$, $Li_2O \geq Na_2O > K_2O$, or $Li_2O > Na_2O \geq K_2O$, and it is particularly preferred that the following relationship be established: $Li_2O > Na_2O > K_2O$. In addition, when the ratio of $K_2O$ is too large, it becomes difficult to keep both the viscosity of the glass and the hydrolytic resistance satisfactory. Accordingly, from the viewpoint of balancing the viscosity and the hydrolytic resistance, it is preferred that the following relationship be established: $Na_2O>K_2O$.

Further, when the ratio of $Li_2O$ with respect to the alkali metal oxides ($R_2O$) contained in the glass is too large, the devitrification resistance of the glass is reduced. Accordingly, in an embodiment, from the viewpoint of the devitrification resistance, the contents of the alkali metal oxides ($R_2O$) may be set so as to satisfy the following relationship: $Na_2O>Li_2O$. In addition, $K_2O$ has the highest effect of improving the devitrification resistance of the glass, and the effect of improving the devitrification resistance of the glass becomes lower in the order of $Na_2O$ and $Li_2O$. From the viewpoint of balancing the hydrolytic resistance and the devitrification resistance of the glass, it is preferred that the following relationship be established among the contents of the alkali metal oxides ($R_2O$): $Li_2O \geq Na_2O \geq K_2O$, $Li_2O \geq K_2O > Na_2O$, or $Li_2O > Na_2O \geq K_2O$, and it is particularly preferred that the following relationship be established: $Li_2O>K_2O>Na_2O$.

In addition, in the glass for a pharmaceutical container of the present invention, with regard to the alkali metal oxides ($R_2O$), it is preferred that the ratio in content of $Li_2O$ to $Na_2O$ and $K_2O$, which is represented by the molar ratio $Li_2O/(Na_2O+K_2O)$, be restricted to fall within an appropriate range. With this configuration, the viscosity of the glass can be reduced without reducing the hydrolytic resistance and the devitrification resistance. Accordingly, the value for the ratio is preferably from 0 to 4.0, from more than 0 to 3.0, from 0.1 to 2.0, or from 0.2 to 1.5, most preferably from 0.3 to 1.0. In this case, the content of $Na_2O+K_2O$ is preferably 0.1% or more.

MgO, CaO, SrO, and BaO, which are alkaline earth metal oxides (R'O), each have an effect of reducing the viscosity of the glass. In addition, MgO, CaO, SrO, and BaO each also affect the hydrolytic resistance. When the contents of those components are too large, the devitrification resistance of the glass is reduced. Besides, there is a risk in that R'O eluted from the glass into a drug may precipitate as a carbonate or a sulfate. In addition, there is a risk in that the hydrolytic resistance may be degraded. Accordingly, the total of the contents of R'O is from 0.01% to 11%, preferably from 0.05% to 10%, from 0.1% to 9%, from 0.5% to 8%, from 0.7% to 7%, from 0.9% to 6%, from 1.0% to 5%, from more than 1% to 4.9%, from 1.1% to 4.8%, from 1.2% to 4.7%, from 1.3% to 4.6%, or from 1.4% to 4.3%, particularly preferably from 1.5% to 4%, or from 1.8% to less than 4%, most preferably from 1.9% to 3.8%.

Herein, the ease of precipitation of the carbonate or the sulfate of the R'O depends on the solubility of each salt. Specifically, MgO has the highest solubility, and the solubility becomes lower in the order of CaO, SrO, and BaO. Accordingly, MgO is least liable to precipitate as a salt, and BaO is most liable to precipitate as a salt. Accordingly, when attention is focused on the solubility, it is preferred that the following relationship be established among the contents of R'O: $MgO \geq CaO$ (particularly $MgO>CaO$), $MgO \geq SrO$ (particularly $MgO>SrO$), $MgO \geq BaO$ (particularly $MgO>BaO$), $CaO \geq SrO$ (particularly $CaO>SrO$), $CaO \geq BaO$ (particularly $CaO>BaO$), or $SrO \geq BaO$ (particularly $SrO>BaO$), it is more preferred that the following relationship be established: $MgO \geq CaO \geq SrO \geq BaO$, and it is still more preferred that the following relationship be established: $MgO>CaO>SrO>BaO$.

Meanwhile, BaO has the highest effect of reducing the viscosity of the glass, and the effect of reducing the viscosity of the glass becomes lower in the order of SrO, CaO, and MgO. Accordingly, when the processability is emphasized, it is preferred that the following relationship be established among the contents of R'O: $MgO \leq CaO$ (particularly $MgO<CaO$), $MgO \leq SrO$ (particularly $MgO<SrO$), $MgO \leq BaO$ (particularly $MgO<BaO$), $CaO \leq SrO$ (particularly $CaO<SrO$), $CaO \leq BaO$ (particularly $CaO<BaO$), or $SrO \leq BaO$ (particularly $SrO<BaO$), it is more preferred that the following relationship be established: $MgO \leq CaO \leq SrO \leq BaO$, and it is still more preferred that the following relationship be established: $MgO<CaO<SrO<BaO$.

In addition, in the glass for a pharmaceutical container of the present invention, it is preferred that the content of MgO be restricted. As described above, MgO is a component that is less liable to precipitate as a salt because the carbonate or the sulfonate thereof has a high solubility. However, MgO is also a component that has the following risk: a Mg ion is liable to react with hydrated silicic acid, and hence when the Mg ion in the glass is eluted, the Mg ion may react with hydrated silicic acid generated on the surface of the glass to form an insoluble hydrated magnesium silicate film. The film may be peeled off by vibration or the like to become flake-like insoluble foreign matter. When the insoluble foreign matter is injected into the body of a patient with a drug, there is a risk in that the foreign matter may also be harmful to the human body owing to, for example, formation of a thrombus in a blood vessel, as in the case of the delamination. In addition, when the content of MgO is too large, the hydrolytic resistance is degraded. Accordingly, the content of MgO is preferably from 0% to 9%, from 0% to 8.5%, from 0% to 5%, from 0% to 4%, from 0% to 3%, from 0% to 2%, from 0% to 1%, or from 0% to 0.01%. The glass is particularly preferably free of MgO. In the present invention, the "free of" means that the component is not positively added, and does not exclude its inclusion as an inevitable impurity.

Among the alkaline earth metal oxides, CaO is a component that is less liable to precipitate as a salt and also less liable to precipitate as insoluble foreign matter. Accordingly, in the present invention, CaO is preferably contained as an essential component. Meanwhile, when CaO is contained in an excessively large amount, there is a risk in that the hydrolytic resistance may be degraded. Accordingly, the content of CaO is from 0.01% to 11%, preferably from 0.01% to 10%, from 0.05% to 10%, from 0.1% to 8%, from 0.5% to 6%, from 0.8% to 5.5%, from 0.9% to 5%, from 1% to 4.5%, from more than 1% to 4%, or from 1.1% to 3.5%, particularly preferably from 1.5% to 3%. In addition, from the viewpoint of emphasizing the processability of the glass, CaO is preferably contained, and the lower limit of the content of CaO is preferably 1% or more, 1.2% or more, 1.4% or more, 1.6% or more, 1.8% or more, 2% or more, 2.2% or more, 2.4% or more, 2.6% or more, 2.8% or more, 3% or more, 3.2% or more, or 3.4% or more, particularly preferably 3.5% or more.

In addition, the value for MgO+CaO is preferably from 0.01% to 8%, from 0.1% to 7%, from 0.3% to 6%, from 0.5% to 5%, from 0.8% to 4.6%, from 0.9% to 4.3%, from 1% to 4%, from more than 1% to 3.8%, or from 1.1% to 3.5%, particularly preferably from 1.5% to 3%. With this configuration, the carbonate or the sulfonate is less liable to precipitate. The "MgO+CaO" refers to the total of the contents of MgO and CaO. In addition, from the viewpoint of emphasizing the processability of the glass, the lower limit of MgO+CaO is preferably 1% or more, 1.2% or more, 1.4% or more, 1.6% or more, 1.8% or more, 2% or more, 2.2% or more, 2.4% or more, 2.6% or more, 2.8% or more, 3% or more, 3.2% or more, or 3.4% or more, particularly preferably 3.5% or more.

In addition, the molar ratio MgO/CaO, which is the molar ratio in content of MgO to CaO, is less than 9.0, preferably 8.0 or less, 7.5 or less, 7.0 or less, 6.0 or less, less than 5.0, less than 3.0, 1.0 or less, less than 1.0, 0.9 or less, less than 0.7, 0.5 or less, less than 0.5, less than 0.4, less than 0.3, less than 0.2, less than 0.1, or less than 0.01, particularly preferably 0. With this configuration, the hydrolytic resistance can be improved. In addition, as described above, in the present invention, MgO has a risk of forming the insoluble foreign matter, but CaO is a component that is less liable to react with $SiO_2$ than MgO, and hence has a lower risk of forming the insoluble foreign matter. Accordingly, when the molar ratio MgO/CaO is restricted, the risk of forming the insoluble foreign matter can be reduced. In addition, the viscosity of the glass can also be reduced, and hence excellent processability can be obtained.

The content of SrO is preferably from 0% to 4%, from 0% to 2%, or from 0% to 1%, particularly preferably from 0% to 0.01%, and it is more preferred that the glass be free of SrO.

The content of BaO is preferably from 0% to 4%, from 0% to 2%, or from 0% to 1%, particularly preferably from 0% to 0.01%, and it is more preferred that the glass be free of BaO.

In addition, in the present invention, the content ratios of the components of the alkaline earth metal oxides (R'O) are appropriately restricted in the glass comprising the alkali metal oxides ($R_2O$) in certain amounts, and hence both excellent processability and excellent hydrolytic resistance can more easily be achieved. Specifically, with regard to the alkaline earth metal oxides, it is preferred that MgO and CaO, which are each less liable to precipitate as a carbonate or a sulfate, be preferentially selected. Further, it is more preferred that the glass be adjusted so as to comprise CaO, which has a higher effect of reducing the viscosity of the glass, in a large amount.

In addition, in the glass for a pharmaceutical container of the present invention, the value for the molar ratio CaO/$Li_2O$ is preferably restricted. The glass for a pharmaceutical container of the present invention can easily be balanced between the hydrolytic resistance and the processability when the value for the molar ratio between the content of CaO and the content of $Li_2O$ is restricted. The lower limit of the molar ratio CaO/$Li_2O$ is preferably more than 0, 0.01 or more, 0.05 or more, 0.1 or more, 0.15 or more, 0.2 or more, 0.25 or more, 0.3 or more, 0.35 or more, 0.4 or more, 0.5 or more, or 0.6 or more. Meanwhile, when the value for the molar ratio CaO/$Li_2O$ is too high, there is a risk in that the processability may be degraded. Accordingly, the upper limit of the molar ratio CaO/$Li_2O$ is preferably 10,000 or less, 1,000 or less, 100 or less, 10 or less, 9 or less, 4 or less, 2 or less, 1.9 or less, 1.8 or less, 1.7 or less, 1.6 or less, 1.5 or less, 1.4 or less, 1.3 or less, 1.2 or less, 1.1 or less, 1 or less, 0.95 or less, 0.9 or less, 0.85 or less, or 0.8 or less.

In addition, in order to improve both the processability and the hydrolytic resistance, it is effective that, among the alkali metal oxides ($R_2O$), $Li_2O$ is contained as an essential component, and the value for MgO/CaO is restricted. Among the alkali metal oxides, $Li_2O$ has a particularly high effect of reducing the viscosity of the glass, but has a risk of degrading the hydrolytic resistance. Accordingly, in order to improve the processability while maintaining the hydrolytic resistance, when both the content of $Li_2O$ and the value for MgO/CaO are restricted to fall within appropriate ranges, both the processability and the hydrolytic resistance of the glass can be improved. Further, the contamination of an inside surface of a container can easily be suppressed at the time of processing by virtue of a low processing temperature. As a result, a pharmaceutical container excellent in hydrolytic resistance and excellent even in chemical durability, can easily be obtained.

Further, in the present invention, both the value for $Li_2O$/($Na_2O+K_2O$) as the alkali metal oxides ($R_2O$) and the value for MgO/CaO are preferably appropriately restricted. That is, when the value for $Li_2O$/($Na_2O+K_2O$) is appropriately restricted, while the effect of $Li_2O$, which has a high effect of reducing the viscosity among the alkali metal oxides, is exhibited, the influence of $Na_2O$, which particularly degrades the hydrolytic resistance, can be suppressed. Besides, when the value for MgO/CaO is restricted to fall within the appropriate ranges, both the processability and the hydrolytic resistance can be improved. Further, the contamination of an inside surface of a container can easily be suppressed by virtue of a low processing temperature. As a result, a pharmaceutical container excellent in hydrolytic resistance and excellent even in chemical durability can easily be obtained.

In addition, in the glass for a pharmaceutical container of the present invention, the value for the molar ratio $Al_2O_3$/($Li_2O+Na_2O+K_2O$) is preferably restricted. The glass for a pharmaceutical container of the present invention can easily be balanced between the hydrolytic resistance and the processability when the value for the molar ratio between the content of $Al_2O_3$ and the total of the contents of the alkali metal oxides ($R_2O$) is restricted. Particularly when the processability of the glass is emphasized, the value for the molar ratio $Al_2O_3$/($Li_2O+Na_2O+K_2O$) is preferably from 0 to 1.2, from more than 0 to 1.2, or from 0.1 to 0.8, more preferably from 0.15 to 0.61, from 0.2 to 0.6, or from 0.25 to 0.59, particularly preferably from 0.3 to 0.52, or from more than 0.3 too. 5, most preferably from 0.35 to 0.45. In addition, particularly when an improvement in the hydrolytic resistance of the glass is emphasized, the value for the molar ratio $Al_2O_3$/($Li_2O+Na_2O+K_2O$) is preferably from 0.52 to 3.0, from more than 0.52 to 2.5, from 0.53 to 2.0, from 0.55 to 1.8, from 0.58 to 1.5, from 0.59 to 1.3, from 0.60 to 1.2, or from 0.61 to 1.1, particularly preferably from 0.62 to 1.

In addition, in the glass for a pharmaceutical container of the present invention, the lower limit of the value for $Al_2O_3$—$Li_2O$ is preferably −3 or more, −2 or more, −1 or more, −0.5 or more, 0 or more, 0.1 or more, 0.5 or more, 0.8 or more, 0.9 or more, 1 or more, 1.1 or more, 1.2 or more, 1.3 or more, 1.4 or more, 1.5 or more, 1.6 or more, 1.7 or more, or 1.8 or more, particularly preferably 1.9 or more. When $Li_2O$, which has a particularly high effect of reducing the viscosity of the glass to improve the processability and the meltability among the alkali metal oxides, is contained in a certain amount with respect to $Al_2O_3$, the hydrolytic resistance and the processability can easily be balanced. Meanwhile, when the upper limit of the value for $Al_2O_3$—$Li_2O$ is too high, there is a risk in that the hydrolytic resistance may be degraded. Accordingly, the upper limit of the value for $Al_2O_3$—$Li_2O$ is 9 or less, 8 or less, 5.9 or less, 5 or less, 4 or less, or 3 or less, particularly 2 or less. The "$Al_2O_3$—$Li_2O$" refers to a value obtained by subtracting the content of $Li_2O$ from the content of $Al_2O_3$.

In addition, in the glass for a pharmaceutical container of the present invention, the value for the molar ratio $Al_2O_3$/$Li_2O$ is preferably restricted. With this configuration, the hydrolytic resistance can be improved. Accordingly, the lower limit of the molar ratio $Al_2O_3/Li_2O$ is preferably 0.9 or more, 1.0 or more, 1.2 or more, or 1.3 or more, particularly preferably 1.4 or more. Meanwhile, when the value is too high, the viscosity of the glass is excessively increased, and there is a risk in that the processability may be degraded. Accordingly, the upper limit of the molar ratio $Al_2O_3/Li_2O$ is preferably 3.0 or less, 2.8 or less, 2.6 or less, 2.5 or less, 2.4 or less, 2.2 or less, or 2.0 or less, particularly preferably 1.8 or less. The "$Al_2O_3/Li_2O$" refers to a value obtained by dividing the content of $Al_2O_3$ by the content of $Li_2O$.

In addition, in the glass for a pharmaceutical container of the present invention, the value for $(B_2O_3+Li_2O+Na_2O+K_2O+MgO+CaO+SrO+BaO)-Al_2O_3$ is preferably from 5 to 15, from 5 to 14, from 5.5 to 13, from 6 to 12, or from 6.5 to 11, particularly preferably from 7 to 10. When the alkali metal oxides ($R_2O$), $B_2O_3$, and the alkaline earth metal oxides (R'O), which each have an effect of reducing the viscosity of the glass to improve the processability and the meltability, are contained in certain amounts with respect to $Al_2O_3$, the hydrolytic resistance and the processability can easily be balanced. The "$(B_2O_3+Li_2O+Na_2O+K_2O+MgO+CaO+SrO+BaO)-Al_2O_3$" refers to a value obtained by subtracting the content of $Al_2O_3$ from the total of the contents of $B_2O_3$, $Li_2O$, $Na_2O$, $K_2O$, MgO, CaO, SrO, and BaO.

In addition, in the glass for a pharmaceutical container of the present invention, when the hydrolytic resistance is emphasized, the value for the molar ratio $Al_2O_3/(B_2O_3+Li_2O+Na_2O+K_2O+MgO+CaO+SrO+BaO)$ is preferably from 0.35 to 1.0, from 0.36 to 0.80, or from 0.40 to 0.70, particularly preferably from 0.45 to 0.60. With this configuration, the hydrolytic resistance can be improved. Meanwhile, when the value is too high, the viscosity of the glass is excessively increased, and there is a risk in that the processability may be degraded. When the processability is emphasized, the value for the molar ratio $Al_2O_3/(B_2O_3+Li_2O+Na_2O+K_2O+MgO+CaO+SrO+BaO)$ is preferably from 0.25 to 0.70, or from 0.30 to 0.60, particularly preferably from 0.32 to 0.50. The "$Al_2O_3/(B_2O_3+Li_2O+Na_2O+K_2O+MgO+CaO+SrO+BaO)$" refers to a value obtained by dividing the content of $Al_2O_3$ by the total of the contents of $B_2O_3$, $Li_2O$, $Na_2O$, $K_2O$, MgO, CaO, SrO, and BaO.

In the glass for a pharmaceutical container of the present invention, the value for $SiO_2+Al_2O_3+B_2O_3+Li_2O+Na_2O+K_2O+MgO+CaO$ is preferably 90% or more, 93% or more, or 95% or more, more preferably 96% or more, 97% or more, or 98% or more, particularly preferably 99% or more. With this configuration, the effects exhibited by the above-mentioned components are obtained more efficiently. The "$SiO_2+Al_2O_3+B_2O_3+Li_2O+Na_2O+K_2O+MgO+CaO$" refers to the total of the contents of $SiO_2$, $Al_2O_3$, $B_2O_3$, $Li_2O$, $Na_2O$, $K_2O$, MgO, and CaO.

In addition, in the glass for a pharmaceutical container of the present invention, the value for $SiO_2+Al_2O_3+B_2O_3+Li_2O+Na_2O+K_2O+MgO+CaO+SrO+BaO$ is preferably 90% or more, 93% or more, 95% or more, 96% or more, 97% or more, or 98% or more, particularly preferably 99% or more. With this configuration, the effects exhibited by the above-mentioned components are obtained more efficiently. The "$SiO_2+Al_2O_3+B_2O_3+Li_2O+Na_2O+K_2O+MgO+CaO+SrO+BaO$" refers to the total of the contents of $SiO_2$, $Al_2O_3$, $B_2O_3$, $Li_2O$, $Na_2O$, $K_2O$, MgO, CaO, SrO, and BaO.

In addition, the glass for a pharmaceutical container of the present invention may comprise, as the glass composition, any other component than those described above. For example, in order to improve the alkali resistance of the glass, the glass may comprise $ZrO_2$. When the alkali resistance is emphasized, the glass may comprise 0.01% or more of $ZrO_2$. However, when the content of $ZrO_2$ is too large, the viscosity of the glass is increased, and besides, also the devitrification resistance is reduced. When $ZrO_2$ is contained, the content thereof is preferably from 0% to 2%, particularly preferably from 0% to 1.5%.

In addition, when the glass is to be colored, $TiO_2$ and $Fe_2O_3$ may be added to batch raw materials. In this case, the sum of the contents of $TiO_2$ and $Fe_2O_3$ is normally 7% or less, 6% or less, 5% or less, 3% or less, or 1% or less, and further, is preferably 0.5% or less.

In addition, the glass may comprise one or more kinds selected from, for example, F, Cl, $Sb_2O_3$, $SnO_2$, and $SO_3$ as a fining agent. In this case, the contents of the fining agents in terms of their sum are normally 5% or less, particularly 1% or less, and further, is preferably 0.5% or less.

In addition, in order to improve the chemical durability, a viscosity at high temperature, and the like, ZnO, $P_2O_5$, $Cr_2O_3$, PbO, $La_2O_3$, $WO_3$, $Nb_2O_5$, $Y_2O_3$, and the like may each be added at 3% or less, 2% or less, 1% or less, less than 1%, or 0.5% or less.

In addition, components such as $H_2$, $CO_2$, CO, $H_2O$, He, Ne, Ar, and $N_2$ may each be contained up to 0.1% as impurities. In addition, the amounts of precious metal elements, such as Pt, Rh, and Au, to be mixed in are each preferably 500 ppm or less, more preferably 300 ppm or less.

In addition to the above-mentioned composition ranges, there may be given, for example, a glass which comprises as a glass composition, in terms of mol %, 69% to 81% of $SiO_2$, 4% to 8% of $Al_2O_3$, 0% to 5% of $B_2O_3$, 5% to 16.4% of $Li_2O+Na_2O+K_2O$, 0.1% to 11% of $Na_2O$, 0.01% to 11% of MgO+CaO+SrO+BaO, and 0.01% to 4% of CaO, which satisfies the following relationship: a molar ratio MgO/CaO<1.0, which has a value for a molar ratio $CaO/Li_2O$ of from more than 0 to 10,000, and which has a working point of 1,260° C. or less. The reasons why the composition ranges of the components are limited and preferred ranges thereof overlap with the contents having already been described, and hence the description thereof is omitted here.

In addition to the above-mentioned the composition ranges, there may be given, for example, a glass which comprises as a glass composition, in terms of mol %, 69% to 81% of $SiO_2$, more than 8% to 12% of $Al_2O_3$, 0% to 5% of $B_2O_3$, 3.2% to 12% of $Li_2O$, 0.1% to 11% of $Na_2O$, and 0.01% to 11% of CaO, which satisfies the following relationship: a molar ratio MgO/CaO<1.0, and which has a value for $Al_2O_3/(Li_2O+Na_2O+K_2O)$ of from 0.52 to 1.10. The reasons why the composition ranges of the components are limited and preferred ranges thereof overlap with the contents having already been described, and hence the description thereof is omitted here.

It is preferred that the glass for a pharmaceutical container of the present invention be classified as at least HGA 1 in a hydrolytic resistance test (washing with acetone) inconformity with ISO 720.

The "classified as at least HGA 1 in a hydrolytic resistance test (washing with acetone) in conformity with ISO 720" means that the alkali elution amount per gram of glass in terms of $Na_2O$ determined through the above-mentioned test is 62 μg/g or less.

In addition, the glass for a pharmaceutical container of the present invention has an alkali elution amount in terms of $Na_2O$ in the hydrolytic resistance test (washing with acetone) in conformity with ISO 720 of preferably less than 527 μg/g, 400 μg/g or less, 200 μg/g or less, 100 μg/g or less, 80 μg/g or less, less than 62 μg/g, 60 μg/g or less, 57 μg/g or less, 55 μg/g or less, or 53 μg/g or less, particularly preferably 50 µg/g or less. When the alkali elution amount is too large, in the case where the glass is processed into an ampoule or a vial, and a drug is filled and stored therein, there is a risk in that components of the drug may be altered by an alkali component eluted from the glass.

In addition, the alkali resistance of the glass serves as one of indicators for judging resistance to delamination. The glass for a pharmaceutical container of the present invention preferably has at least class 2 alkali resistance in a test in conformity with ISO 695. Herein, the "alkali resistance test in conformity with ISO 695" refers to the following test.
(1) A glass sample piece in which all surfaces thereof have been mirror finished and which has a surface area of A $cm^2$ (where A represents from 10 $cm^2$ to 15 $cm^2$) is prepared. First, as pretreatment for the sample, a solution in which hydrofluoric acid (40 wt %) and hydrochloric acid (2 mol/L) are mixed at a volume ratio of 1:9 is prepared. The sample is immersed in the solution, and stirred for 10 minutes with a magnetic stirrer. The sample is taken out therefrom, ultrasonically washed with purified water for 2 minutes three times, and ultrasonically washed with ethanol for 1 minute twice.
(2) After that, the sample is dried in an oven at 110° C. for 1 hour, and left to cool in a desiccator for 30 minutes.
(3) The mass m1 of the sample is measured at an accuracy of ±0.1 mg and recorded.
(4) 800 mL of a solution in which a sodium hydroxide aqueous solution (1 mol/L) and a sodium carbonate aqueous solution (0.5 mol/L) are mixed at a volume ratio of 1:1 is prepared. The solution is loaded into a container made of stainless steel, and boiled with a heating mantle. While being hung with a platinum wire, the sample is loaded thereinto and retained for 3 hours. The sample is taken out therefrom, ultrasonically washed with purified water for 2 minutes three times, and ultrasonically washed with ethanol for 1 minute twice. After that, the sample is dried in an oven at 110° C. for 1 hour, and left to cool in a desiccator for 30 minutes.
(5) The mass m2 of the sample is measured at an accuracy of ±0.1 mg and recorded.
(6) The loss in mass per unit area is calculated from the masses m1 and m2 (mg) before and after the loading into the boiled alkali solution and the surface area A ($cm^2$) of the sample based on the following calculation formula, and is used as a measurement value for the alkali resistance test.

(Loss in mass per unit area)=$100 \times (m1-m2)/A$

The "class 2 alkali resistance in a test in conformity with ISO 695" means that the loss in mass per unit area determined as described above is 175 mg/$dm^2$ or less. When the loss in mass per unit area determined as described above is 75 mg/$dm^2$ or less, the glass "has class 1 alkali resistance in a test in conformity with ISO 695."

The delamination often occurs when a drug is filled and stored in a glass container in combination with a solution, such as a citrate or phosphate buffer solution, which behaves as if it had strong alkalinity even at a pH around neutral. When the loss in mass per unit area determined through the test in conformity with ISO 695 is more than 175 mg/$dm^2$, the possibility that the delamination occurs is increased. Accordingly, in the glass for a pharmaceutical container of the present invention, the loss in mass per unit area is preferably 130 mg/$dm^2$ or less, 75 mg/$dm^2$ or less, 70 mg/$dm^2$ or less, or 65 mg/$dm^2$ or less, particularly preferably 60 mg/$dm^2$ or less.

In addition, in the glass fora pharmaceutical container of the present invention, the loss in mass per unit area in an acid resistance test in conformity with YBB00342004 is preferably 1.5 mg/$dm^2$ or less, particularly preferably 0.7 mg/$dm^2$ or less. When the loss in mass is increased, in the case where a bottle container, such as an ampoule or a vial, is produced, and a drug solution is filled and stored therein, there is a risk in that components of the drug solution may be altered owing to significant increases in elution amounts of glass components. The "acid resistance test in conformity with YBB00342004" refers to the following test.
(1) A glass sample piece in which all surfaces thereof have been mirror finished and which has a surface area of A $cm^2$ (where A represents 100±5 $cm^2$) is prepared. First, as pretreatment for the sample, a solution in which hydrofluoric acid (40 wt %) and hydrochloric acid (2 mol/L) are mixed at a volume ratio of 1:9 is prepared. The sample is immersed in the solution, and stirred for 10 minutes with a magnetic stirrer. The sample is taken out therefrom, ultrasonically washed with purified water for 2 minutes three times, and ultrasonically washed with ethanol for 1 minute twice.
(2) After that, the sample is dried in an oven at 110° C. for 1 hour, and left to cool in a desiccator for 30 minutes.
(3) The mass m1 of the sample is measured at an accuracy of ±0.1 mg and recorded.
(4) 800 mL of a hydrochloric acid solution (6 mol/L) is prepared. The solution is loaded into a container made of silica glass, and boiled with an electric heater. While being hung with a platinum wire, the sample is loaded thereinto and retained for 6 hours. The sample is taken out therefrom, ultrasonically washed with purified water for 2 minutes three times, and ultrasonically washed with ethanol for 1 minute twice. After that, the sample is dried in an oven at 110° C. for 1 hour, and left to cool in a desiccator for 30 minutes.
(5) The mass m2 of the sample is measured at an accuracy of ±0.1 mg and recorded.
(6) The half loss in mass per unit area is calculated from the masses m1 and m2 (mg) before and after the loading into the boiled acid solution and the surface area A ($cm^2$) of the sample based on the following calculation formula, and is used as a measurement value for the acid resistance test.

(Loss in mass per unit area)=$½ \times 100 \times (m1-m2)/A$

In addition, the glass for a pharmaceutical container of the present invention has a working point of preferably 1,270° C. or less, 1,265° C. or less, 1,260° C. or less, 1,230° C. or less, or 1,200° C. or less, particularly preferably 1,180° C. or less. When the working point is increased, a processing temperature at the time of processing of a glass tube into an ampoule or a vial is also increased, with the result that the vaporization amounts of alkali components contained in the glass are remarkably increased. The vaporized alkali components adhere to an inside wall of the glass tube, and the glass tube is processed into a glass container. Such glass container causes alternation of a drug when the drug is filled and stored therein. In addition, in the case of a glass comprising boron in a large amount, the vaporization amount of boron is also increased when the working point is increased, which may cause the delamination.

The glass for a pharmaceutical container of the present invention may be subjected to chemical tempering treatment to form a compressive stress layer in a surface thereof. Specifically, when the glass for a pharmaceutical container of the present invention is subjected to chemical tempering (ion exchange) treatment by being immersed in a $KNO_3$ molten salt at 475° C. for 7 hours, the resultant compressive stress layer has a compressive stress value of preferably 100 MPa or more, or 200 MPa or more, particularly preferably 300 MPa or more. In addition, the depth of the compressive stress layer is preferably 10 μm or more, or 20 μm or more, particularly preferably 30 μm or more.

The compressive stress value (CS) and the depth of layer (DOL) from a sampler surface after chemical tempering (ion exchange) may be measured as described below. First, a sample is mirror polished on both surfaces thereof, and is then subjected to chemical tempering (ion exchange) treatment by being immersed in a $KNO_3$ molten salt at 475° C. for 7 hours. Subsequently, the surface of the sample is washed, and the compressive stress value (CS) of the compressive stress layer in the surface and the depth of layer (DOL) from the sample surface are calculated based on the number of interference fringes observed with a surface stress meter (FSM-6000 manufactured by Orihara Industrial Co., Ltd.) and intervals therebetween. In the calculation, the refractive index and the optical elastic constant of the sample are set to 1.50 and 29.5 [(nm/cm)/MPa], respectively. Although the glass composition in a surface layer of the glass microscopically varies before and after the chemical tempering treatment, the glass composition does not substantially vary as a whole of the glass.

Next, a method of manufacturing a glass tube for a pharmaceutical container of the present invention is described. The following description is given of an example using a Danner method.

First, glass raw materials are blended so as to give a predetermined glass composition, to thereby produce a glass batch. Next, the glass batch is continuously loaded into a melting kiln at from 1,550° C. to 1,700° C. to be melted and fined, and then, while the resultant molten glass is wound around a rotating refractory, the glass is drawn into a tube shape from a tip of the refractory with air blown from the tip.

Subsequently, the glass having been drawn into a tube shape is cut into a predetermined length. Thus, a glass tube is obtained. The glass tube thus obtained is used in manufacturing of a vial or an ampoule.

Without limitation to the Danner method, the glass tube for a pharmaceutical container of the present invention may be manufactured by any method that has hitherto been well known. For example, a Vello method and a down-draw method are each useful as the method of manufacturing the glass tube for a pharmaceutical container of the present invention.

Next, a method of manufacturing a pharmaceutical container of the present invention is described. As an example thereof, the following description is given of an example in which the pharmaceutical container is manufactured by processing a glass tube by a vertical processing method.

First, a glass tube is prepared. Next, the glass tube in an upright state is heated at an end portion thereof on one side with a burner to form a shoulder portion and a finish portion with a forming tool. Next, a portion of the glass tube above the shoulder portion is heated with the burner to be melt-cut.

Subsequently, the portion having been melt-cut is heated with the burner to be formed, to thereby form a bottom portion. Thus, a pharmaceutical container is obtained.

A portion having been melt-cut on a glass tube side is heated with the burner to be opened, and used in manufacturing of the next container. When the above-mentioned forming processing is repeated as described above, a plurality of pharmaceutical containers can be obtained from the glass tube.

Further, when the pharmaceutical container, such as an ampoule or a vial, obtained by using the glass tube for a pharmaceutical container of the present invention is ion exchanged by being immersed in a $KNO_3$ molten salt, a chemically-tempered pharmaceutical container can be obtained.

In addition, an outer surface of the glass tube for a pharmaceutical container of the present invention may be coated. Any material selected from inorganic coating materials and organic coating material, such as fluorine, silicon, and a surfactant, may be used as the coating.

Further, an inner surface and/or an outer surface of the pharmaceutical container, such as an ampoule or a vial, obtained by using the glass tube for a pharmaceutical container of the present invention may be coated. Any material selected from inorganic coating materials and organic coating material, such as fluorine, silicon, and a surfactant, may be used as the coating.

EXAMPLES

The present invention is described below by way of Examples.

Examples (Sample Nos. 1 to 51 and 56 to 108) of the present invention and Comparative Examples (Sample Nos. 52 to 55) are shown in Tables 1 to 10.

TABLE 1

| mol % | No. 1 | No. 2 | No. 3 | No. 4 | No. 5 | No. 6 | No. 7 | No. 8 | No. 9 | No. 10 | No. 11 | No. 12 |
|---|---|---|---|---|---|---|---|---|---|---|---|---|
| $SiO_2$ | 76.9 | 75.9 | 76.9 | 77.3 | 77.4 | 77.0 | 77.1 | 77.7 | 77.1 | 77.2 | 76.1 | 76.7 |
| $Al_2O_3$ | 6.0 | 6.0 | 6.0 | 6.0 | 6.0 | 6.2 | 6.1 | 6.0 | 6.4 | 6.0 | 6.6 | 6.0 |
| $B_2O_3$ | 0.1 | 0.1 | 0.1 | 0.1 | 0.1 | 0.1 | 0.1 | 0.1 | 0.1 | 0.1 | 0.1 | 0.1 |
| $Li_2O$ | 6.1 | 6.1 | 6.1 | 6.2 | 6.1 | 6.3 | 6.1 | 6.1 | 6.1 | 6.3 | 6.5 | 6.1 |
| $Na_2O$ | 5.9 | 5.9 | 5.9 | 5.8 | 5.9 | 5.8 | 4.9 | 5.8 | 5.8 | 5.8 | 5.8 | 5.9 |
| $K_2O$ | 1.9 | 1.9 | 1.9 | 1.5 | 1.5 | 1.5 | 1.9 | 0.0 | 0.0 | 1.9 | 1.9 | 0.0 |
| MgO | 0.0 | 1.5 | 1.0 | 0.0 | 0.0 | 0.0 | 0.0 | 0.0 | 0.0 | 0.1 | 0.5 | 1.5 |
| CaO | 2.4 | 1.9 | 1.4 | 2.3 | 2.3 | 2.3 | 3.1 | 3.6 | 3.8 | 1.8 | 1.9 | 3.0 |
| SrO | 0.0 | 0.0 | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 | 0.0 | 0.0 |
| $ZrO_2$ | 0.5 | 0.5 | 0.5 | 0.5 | 0.5 | 0.5 | 0.5 | 0.5 | 0.5 | 0.5 | 0.5 | 0.5 |
| $SnO_2$ | 0.2 | 0.2 | 0.2 | 0.2 | 0.2 | 0.2 | 0.2 | 0.2 | 0.2 | 0.2 | 0.2 | 0.2 |
| $R_2O$ ($Li_2O + Na_2O + K_2O$) | 13.9 | 13.9 | 13.9 | 13.6 | 13.5 | 13.6 | 13.0 | 12.0 | 12.0 | 14.1 | 14.2 | 12.0 |
| R'O (MgO + CaO + SrO + BaO) | 2.4 | 3.4 | 2.4 | 2.3 | 2.3 | 2.3 | 3.1 | 3.6 | 3.8 | 1.9 | 2.3 | 4.5 |
| MgO/CaO | 0.00 | 0.79 | 0.71 | 0.00 | 0.00 | 0.00 | 0.00 | 0.00 | 0.00 | 0.05 | 0.26 | 0.50 |
| CaO/$Li_2O$ | 0.39 | 0.31 | 0.23 | 0.38 | 0.38 | 0.37 | 0.51 | 0.59 | 0.62 | 0.29 | 0.29 | 0.49 |
| $Li_2O$/($Na_2O + K_2O$) | 0.78 | 0.78 | 0.78 | 0.85 | 0.82 | 0.87 | 0.90 | 1.05 | 1.05 | 0.82 | 0.84 | 1.04 |
| $Al_2O_3$/$R_2O$ | 0.43 | 0.43 | 0.43 | 0.44 | 0.44 | 0.45 | 0.47 | 0.50 | 0.53 | 0.43 | 0.47 | 0.50 |

TABLE 1-continued

| mol % | No. 1 | No. 2 | No. 3 | No. 4 | No. 5 | No. 6 | No. 7 | No. 8 | No. 9 | No. 10 | No. 11 | No. 12 |
|---|---|---|---|---|---|---|---|---|---|---|---|---|
| Ps [° C.] | — | — | — | 479 | 479 | 479 | 487 | 499 | 503 | 474 | 476 | 494 |
| Ta [° C.] | — | — | — | 524 | 523 | 524 | 532 | 544 | 547 | 519 | 520 | 539 |
| Ts [° C.] | — | — | — | 758 | 758 | 758 | 767 | 779 | 782 | 753 | 755 | 777 |
| Working point ($10^{4.0}$ dPa · s) [° C.] | 1,176 | 1,179 | 1,191 | 1,178 | 1,180 | 1,178 | 1,186 | 1,198 | 1,200 | 1,171 | 1,176 | 1,197 |
| $10^{3.0}$ dPa · s [° C.] | 1,408 | 1,408 | 1,424 | 1,411 | 1,411 | 1,410 | 1,418 | 1,428 | 1,430 | 1,402 | 1,407 | 1,422 |
| Hydrolytic resistance test [µg/g] | 59 | 60 | 54 | 55 | 57 | 55 | 55 | 53 | 53 | 57 | 54 | 55 |

TABLE 2

| mol % | No. 13 | No. 14 | No. 15 | No. 16 | No. 17 | No. 18 | No. 19 | No. 20 | No. 21 | No. 22 | No. 23 | No. 24 |
|---|---|---|---|---|---|---|---|---|---|---|---|---|
| $SiO_2$ | 72.6 | 77.0 | 73.4 | 73.0 | 73.4 | 73.5 | 76.0 | 76.0 | 73.5 | 76.1 | 73.4 | 73.4 |
| $Al_2O_3$ | 8.5 | 6.0 | 9.5 | 9.4 | 8.7 | 8.7 | 6.0 | 6.0 | 8.6 | 6.0 | 9.5 | 9.4 |
| $B_2O_3$ | 0.1 | 0.1 | 0.1 | 0.1 | 0.1 | 0.1 | 0.1 | 0.1 | 0.1 | 0.1 | 0.1 | 0.1 |
| $Li_2O$ | 6.1 | 6.0 | 6.1 | 6.1 | 6.1 | 6.1 | 6.1 | 7.0 | 6.1 | 6.1 | 6.1 | 6.1 |
| $Na_2O$ | 5.8 | 0.0 | 5.8 | 5.8 | 5.8 | 5.8 | 1.9 | 0.1 | 5.8 | 3.4 | 5.8 | 5.8 |
| $K_2O$ | 1.9 | 0.0 | 1.9 | 1.9 | 1.9 | 1.9 | 1.9 | 1.9 | 1.8 | 1.9 | 1.9 | 1.9 |
| MgO | 1.5 | 0.1 | 0.2 | 0.0 | 1.0 | 0.2 | 1.5 | 1.5 | 0.1 | 1.5 | 0.7 | 0.0 |
| CaO | 2.8 | 10.2 | 2.3 | 3.0 | 2.3 | 3.0 | 5.7 | 6.8 | 3.3 | 4.3 | 1.8 | 2.5 |
| SrO | 0.0 | 0.0 | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 | 0.0 | 0.0 |
| $ZrO_2$ | 0.5 | 0.5 | 0.5 | 0.5 | 0.5 | 0.5 | 0.5 | 0.5 | 0.5 | 0.5 | 0.5 | 0.5 |
| $SnO_2$ | 0.2 | 0.2 | 0.2 | 0.2 | 0.2 | 0.2 | 0.2 | 0.2 | 0.2 | 0.2 | 0.2 | 0.2 |
| $R_2O$ ($Li_2O + Na_2O + K_2O$) | 13.8 | 6.0 | 13.8 | 13.8 | 13.8 | 13.8 | 10.0 | 8.9 | 13.7 | 11.4 | 13.8 | 13.8 |
| R'O (MgO + CaO + SrO + BaO) | 4.3 | 10.2 | 2.5 | 3.0 | 3.3 | 3.3 | 7.2 | 8.3 | 3.4 | 5.8 | 2.5 | 2.5 |
| MgO/CaO | 0.53 | 0.00 | 0.09 | 0.00 | 0.43 | 0.07 | 0.27 | 0.23 | 0.02 | 0.35 | 0.41 | 0.00 |
| $CaO/Li_2O$ | 0.46 | 1.70 | 0.38 | 0.49 | 0.38 | 0.49 | 0.93 | 0.97 | 0.54 | 0.70 | 0.29 | 0.41 |
| $Li_2O/(Na_2O + K_2O)$ | 0.80 | — | 0.79 | 0.79 | 0.79 | 0.80 | 1.60 | 3.59 | 0.80 | 1.17 | 0.79 | 0.79 |
| $Al_2O_3/R_2O$ | 0.61 | 1.01 | 0.69 | 0.68 | 0.63 | 0.63 | 0.60 | 0.67 | 0.62 | 0.53 | 0.68 | 0.68 |
| Ps [° C.] | 497 | 583 | — | — | — | — | 523 | 539 | 501 | 502 | 508 | 509 |
| Ta [° C.] | 542 | 630 | — | — | — | — | 568 | 584 | 545 | 548 | 555 | 555 |
| Ts [° C.] | 778 | 861 | — | — | — | — | 807 | 823 | 779 | 787 | 806 | 799 |
| Working point ($10^{4.0}$ dPa · s) [° C.] | 1,193 | 1,243 | — | — | — | — | 1,217 | 1,219 | 1,196 | 1,203 | 1,245 | 1,234 |
| $10^{3.0}$ dPa · s [° C.] | 1,416 | 1,453 | — | — | — | — | 1,437 | 1,433 | 1,424 | 1,427 | 1,476 | 1,466 |
| Hydrolytic resistance test [µg/g] | 53 | 38 | — | — | — | — | 47 | 42 | 49 | 50 | 45 | 43 |

TABLE 3

| mol % | No. 25 | No. 26 | No. 27 | No. 28 | No. 29 | No. 30 | No. 31 | No. 32 | No. 33 | No. 34 | No. 35 | No. 36 |
|---|---|---|---|---|---|---|---|---|---|---|---|---|
| $SiO_2$ | 73.4 | 73.4 | 69.0 | 80.9 | 77.8 | 76.8 | 74.8 | 72.8 | 78.2 | 71.2 | 75.3 | 75.2 |
| $Al_2O_3$ | 8.7 | 8.7 | 10.0 | 4.0 | 6.0 | 6.0 | 6.0 | 6.0 | 5.0 | 10.0 | 7.0 | 7.0 |
| $B_2O_3$ | 0.1 | 0.1 | 0.4 | 0.1 | 0.0 | 1.0 | 3.0 | 5.0 | 0.1 | 0.1 | 0.1 | 0.1 |
| $Li_2O$ | 6.1 | 6.1 | 6.1 | 5.1 | 6.1 | 6.1 | 6.1 | 6.1 | 2.6 | 8.1 | 0.0 | 0.1 |
| $Na_2O$ | 5.8 | 5.8 | 5.9 | 4.9 | 5.8 | 5.8 | 5.8 | 5.8 | 2.4 | 7.9 | 11.0 | 11.0 |
| $K_2O$ | 1.9 | 1.9 | 1.9 | 1.3 | 0.0 | 0.0 | 0.0 | 0.0 | 1.0 | 1.9 | 2.9 | 2.9 |
| MgO | 1.5 | 0.7 | 2.0 | 1.0 | 0.0 | 0.0 | 0.0 | 0.0 | 3.0 | 0.0 | 1.0 | 1.0 |
| CaO | 1.8 | 2.5 | 4.0 | 2.0 | 3.6 | 3.6 | 3.6 | 3.6 | 7.0 | 0.1 | 2.0 | 2.0 |
| SrO | 0.0 | 0.0 | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 | 0.0 | 0.0 |
| $ZrO_2$ | 0.5 | 0.5 | 0.5 | 0.5 | 0.5 | 0.5 | 0.5 | 0.5 | 0.5 | 0.5 | 0.5 | 0.5 |
| $SnO_2$ | 0.2 | 0.2 | 0.2 | 0.2 | 0.2 | 0.2 | 0.2 | 0.2 | 0.2 | 0.2 | 0.2 | 0.2 |
| $R_2O$ ($Li_2O + Na_2O + K_2O$) | 13.8 | 13.8 | 13.9 | 11.3 | 12.0 | 11.9 | 11.9 | 11.9 | 6.0 | 17.9 | 13.9 | 14.0 |
| R'O (MgO + CaO + SrO + BaO) | 3.3 | 3.3 | 6.0 | 3.0 | 3.6 | 3.6 | 3.6 | 3.6 | 10.0 | 0.1 | 3.0 | 3.0 |
| MgO/CaO | 0.84 | 0.29 | 0.50 | 0.50 | 0.00 | 0.00 | 0.00 | 0.00 | 0.43 | 0.00 | 0.50 | 0.50 |
| $CaO/Li_2O$ | 0.29 | 0.41 | 0.66 | 0.39 | 0.59 | 0.59 | 0.59 | 0.59 | 2.69 | 0.01 | — | 20.00 |
| $Li_2O/(Na_2O + K_2O)$ | 0.79 | 0.80 | 0.78 | 0.82 | 1.05 | 1.05 | 1.05 | 1.05 | 0.76 | 0.83 | 0.00 | 0.01 |
| $Al_2O_3/R_2O$ | 0.63 | 0.63 | 0.72 | 0.35 | 0.50 | 0.50 | 0.50 | 0.50 | 0.83 | 0.56 | 0.50 | 0.50 |
| Ps [° C.] | 500 | 500 | — | — | — | — | — | — | — | — | — | — |
| Ta [° C.] | 546 | 545 | — | — | — | — | — | — | — | — | — | — |
| Ts [° C.] | 793 | 785 | — | — | — | — | — | — | — | — | — | — |
| Working point ($10^{4.0}$ dPa · s) [° C.] | 1,225 | 1,213 | — | — | — | — | — | — | — | — | — | — |

TABLE 3-continued

| mol % | No. 25 | No. 26 | No. 27 | No. 28 | No. 29 | No. 30 | No. 31 | No. 32 | No. 33 | No. 34 | No. 35 | No. 36 |
|---|---|---|---|---|---|---|---|---|---|---|---|---|
| $10^{3.0}$ dPa · s [° C.] | 1,453 | 1,442 | — | — | — | — | — | — | — | — | — | — |
| Hydrolytic resistance test [μg/g] | 47 | 46 | — | — | — | — | — | — | — | — | — | — |

TABLE 4

| mol % | No. 37 | No. 38 | No. 39 | No. 40 | No. 41 | No. 42 | No. 43 | No. 44 | No. 45 | No. 46 | No. 47 | No. 48 |
|---|---|---|---|---|---|---|---|---|---|---|---|---|
| $SiO_2$ | 78.2 | 75.3 | 73.8 | 75.8 | 76.8 | 71.9 | 72.0 | 72.7 | 72.7 | 72.3 | 72.2 | 72.3 |
| $Al_2O_3$ | 4.0 | 7.0 | 7.0 | 7.0 | 7.0 | 9.5 | 9.4 | 8.7 | 8.7 | 9.0 | 9.0 | 9.0 |
| $B_2O_3$ | 0.1 | 0.1 | 0.1 | 0.1 | 0.1 | 0.1 | 0.1 | 0.1 | 0.1 | 0.1 | 0.1 | 0.1 |
| $Li_2O$ | 11.1 | 2.0 | 6.1 | 6.1 | 6.1 | 6.1 | 6.1 | 6.1 | 6.1 | 0.0 | 0.1 | 2.0 |
| $Na_2O$ | 2.0 | 11.0 | 5.9 | 5.9 | 5.9 | 5.8 | 5.8 | 5.8 | 5.8 | 11.0 | 11.0 | 11.0 |
| $K_2O$ | 0.9 | 0.9 | 1.9 | 1.9 | 1.9 | 1.9 | 1.9 | 1.9 | 1.9 | 2.9 | 2.9 | 0.9 |
| MgO | 1.0 | 1.0 | 4.0 | 2.0 | 1.0 | 1.5 | 1.0 | 1.5 | 1.0 | 1.0 | 1.0 | 1.0 |
| CaO | 2.0 | 2.0 | 0.5 | 0.5 | 0.5 | 2.5 | 3.0 | 2.5 | 3.0 | 3.0 | 3.0 | 3.0 |
| SrO | 0.0 | 0.0 | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 | 0.0 | 0.0 |
| $ZrO_2$ | 0.5 | 0.5 | 0.5 | 0.5 | 0.5 | 0.5 | 0.5 | 0.5 | 0.5 | 0.5 | 0.5 | 0.5 |
| $SnO_2$ | 0.2 | 0.2 | 0.2 | 0.2 | 0.2 | 0.2 | 0.2 | 0.2 | 0.2 | 0.2 | 0.2 | 0.2 |
| $R_2O$ ($Li_2O$ + $Na_2O$ + $K_2O$) | 14.0 | 14.0 | 13.9 | 13.9 | 13.9 | 13.8 | 13.8 | 13.8 | 13.8 | 13.9 | 14.0 | 14.0 |
| R'O (MgO + CaO + SrO + BaO) | 3.0 | 3.0 | 4.5 | 2.5 | 1.5 | 4.0 | 4.0 | 4.0 | 4.0 | 4.0 | 4.0 | 4.0 |
| MgO/CaO | 0.50 | 0.50 | 8.00 | 4.00 | 2.00 | 0.60 | 0.33 | 0.60 | 0.33 | 0.33 | 0.33 | 0.33 |
| CaO/$Li_2O$ | 0.18 | 1.00 | 0.08 | 0.08 | 0.08 | 0.41 | 0.49 | 0.41 | 0.49 | — | 30.00 | 1.50 |
| $Li_2O$/($Na_2O$ + $K_2O$) | 3.83 | 0.17 | 0.78 | 0.78 | 0.78 | 0.79 | 0.79 | 0.79 | 0.79 | 0.00 | 0.01 | 0.17 |
| $Al_2O_3$/$R_2O$ | 0.29 | 0.50 | 0.50 | 0.50 | 0.50 | 0.69 | 0.68 | 0.63 | 0.63 | 0.65 | 0.64 | 0.64 |
| Ps [° C.] | — | — | — | — | — | — | — | — | — | — | — | — |
| Ta [° C.] | — | — | — | — | — | — | — | — | — | — | — | — |
| Ts [° C.] | — | — | — | — | — | — | — | — | — | — | — | — |
| Working point ($10^{4.0}$ dPa · s) [° C.] | — | — | — | — | — | — | — | — | — | — | — | — |
| $10^{3.0}$ dPa · s [° C.] | — | — | — | — | — | — | — | — | — | — | — | — |
| Hydrolytic resistance test [μg/g] | — | — | — | — | — | — | — | — | — | — | — | — |

TABLE 5

| mol % | No. 49 | No. 50 | No. 51 | No. 52 | No. 53 | No. 54 | No. 55 |
|---|---|---|---|---|---|---|---|
| $SiO_2$ | 74.8 | 76.8 | 77.8 | 74.3 | 75.1 | 77.0 | 77.1 |
| $Al_2O_3$ | 6.0 | 6.0 | 6.0 | 6.0 | 6.3 | 6.0 | 6.0 |
| $B_2O_3$ | 0.1 | 0.1 | 0.1 | 0.1 | 0.0 | 0.0 | 0.0 |
| $Li_2O$ | 6.1 | 6.1 | 6.1 | 6.1 | 0.0 | 0.0 | 0.0 |
| $Na_2O$ | 5.9 | 5.9 | 5.9 | 5.9 | 12.5 | 11.4 | 11.3 |
| $K_2O$ | 1.9 | 1.9 | 1.9 | 1.9 | 0.1 | 0.1 | 0.1 |
| MgO | 4.0 | 2.0 | 1.0 | 4.5 | 5.1 | 1.8 | 0.1 |
| CaO | 0.5 | 0.5 | 0.5 | 0.5 | 0.7 | 3.5 | 5.1 |
| SrO | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 |
| $ZrO_2$ | 0.5 | 0.5 | 0.5 | 0.5 | 0.0 | 0.0 | 0.0 |
| $SnO_2$ | 0.2 | 0.2 | 0.2 | 0.2 | 0.2 | 0.2 | 0.2 |
| $R_2O$ ($Li_2O$ + $Na_2O$ + $K_2O$) | 13.9 | 13.9 | 13.9 | 13.9 | 12.7 | 11.5 | 11.4 |
| R'O (MgO + CaO + SrO + BaO) | 4.5 | 2.5 | 1.5 | 5.0 | 5.8 | 5.3 | 5.2 |
| MgO/CaO | 8.00 | 4.00 | 2.00 | 9.00 | 7.71 | 0.53 | 0.02 |
| CaO/$Li_2O$ | 0.08 | 0.08 | 0.08 | 0.08 | — | — | — |
| $Li_2O$/($Na_2O$ + $K_2O$) | 0.78 | 0.78 | 0.78 | 0.78 | 0.00 | 0.00 | 0.00 |
| $Al_2O_3$/$R_2O$ | 0.43 | 0.43 | 0.43 | 0.43 | 0.50 | 0.52 | 0.52 |
| Ps [° C.] | — | — | — | 481 | 562 | 566 | 561 |
| Ta [° C.] | — | — | — | 527 | 615 | 611 | 610 |
| Ts [° C.] | — | — | — | 769 | 876 | 847 | 834 |
| Working point ($10^{4.0}$ dPa · s) [° C.] | — | — | — | 1,179 | 1,297 | — | — |
| $10^{3.0}$ dPa · s [° C.] | — | — | — | 1,415 | 1,398 | — | — |
| Hydrolytic resistance test [μg/g] | — | — | — | 65 | 78 | 89 | 97 |

TABLE 6

| mol % | No. 56 | No. 57 | No. 58 | No. 59 | No. 60 | No. 61 | No. 62 | No. 63 | No. 64 | No. 65 | No. 66 | No. 67 |
|---|---|---|---|---|---|---|---|---|---|---|---|---|
| $SiO_2$ | 74.2 | 74.2 | 75.2 | 75.7 | 77.2 | 78.7 | 76.2 | 74.2 | 73.2 | 72.2 | 73.2 | 77.2 |
| $Al_2O_3$ | 8.5 | 9.5 | 8.6 | 7.0 | 5.5 | 4.0 | 7.5 | 9.0 | 9.0 | 9.5 | 8.5 | 6.6 |
| $B_2O_3$ | 0.1 | 0.1 | 0.1 | 0.1 | 0.1 | 0.1 | 0.1 | 0.1 | 0.1 | 0.1 | 0.1 | 0.1 |
| $Li_2O$ | 6.1 | 6.1 | 6.1 | 6.1 | 6.1 | 6.1 | 6.1 | 6.1 | 6.1 | 6.1 | 6.1 | 6.1 |
| $Na_2O$ | 5.9 | 5.9 | 5.8 | 5.9 | 5.9 | 5.9 | 5.9 | 5.9 | 5.9 | 5.9 | 5.9 | 5.8 |
| $K_2O$ | 1.9 | 1.9 | 1.9 | 1.9 | 1.9 | 1.9 | 1.9 | 1.9 | 1.9 | 1.9 | 1.9 | 1.9 |
| MgO | 0.0 | 0.0 | 0.0 | 0.0 | 0.0 | 0.0 | 0.0 | 0.0 | 0.0 | 0.0 | 0.0 | 0.0 |
| CaO | 2.6 | 1.6 | 1.6 | 2.6 | 2.6 | 2.6 | 1.6 | 2.1 | 3.1 | 3.6 | 3.6 | 1.7 |
| SrO | 0.0 | 0.0 | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 | 0.0 | 0.0 |
| $ZrO_2$ | 0.5 | 0.5 | 0.5 | 0.5 | 0.5 | 0.5 | 0.5 | 0.5 | 0.5 | 0.5 | 0.5 | 0.6 |
| $SnO_2$ | 0.2 | 0.2 | 0.2 | 0.2 | 0.2 | 0.2 | 0.2 | 0.2 | 0.2 | 0.2 | 0.2 | 0.2 |
| $R_2O$ ($Li_2O + Na_2O + K_2O$) | 13.9 | 13.9 | 13.8 | 13.9 | 13.9 | 13.9 | 13.9 | 13.9 | 13.9 | 13.9 | 13.9 | 13.8 |
| R'O (MgO + CaO + SrO + BaO) | 2.6 | 1.6 | 1.6 | 2.6 | 2.6 | 2.6 | 1.6 | 2.1 | 3.1 | 3.6 | 3.6 | 1.7 |
| MgO/CaO | 0.00 | 0.00 | 0.00 | 0.00 | 0.00 | 0.00 | 0.00 | 0.00 | 0.00 | 0.00 | 0.00 | 0.00 |
| $CaO/Li_2O$ | 0.43 | 0.26 | 0.27 | 0.43 | 0.43 | 0.43 | 0.26 | 0.34 | 0.51 | 0.59 | 0.59 | 0.27 |
| $Li_2O/(Na_2O + K_2O)$ | 0.78 | 0.78 | 0.80 | 0.78 | 0.78 | 0.78 | 0.78 | 0.78 | 0.78 | 0.78 | 0.78 | 0.80 |
| $Al_2O_3/R_2O$ | 0.61 | 0.68 | 0.62 | 0.50 | 0.40 | 0.29 | 0.54 | 0.65 | 0.65 | 0.68 | 0.61 | 0.47 |
| Ps [° C.] | 500 | 510 | 498 | — | — | — | — | — | — | — | — | 480 |
| Ta [° C.] | 545 | 557 | 545 | — | — | — | — | — | — | — | — | 526 |
| Ts [° C.] | 784 | 809 | 793 | — | — | — | — | — | — | — | — | 765 |
| Working point ($10^{4.0}$ dPa·s) [° C.] | 1,213 | 1,258 | 1,238 | 1,192 | — | — | 1,223 | 1,235 | — | — | — | 1,200 |
| $10^{3.0}$ dPa·s [° C.] | 1,442 | 1,493 | 1,475 | — | — | — | — | — | — | — | — | 1,436 |
| Linear thermal expansion coefficient (20° C. to 300° C.) | — | — | — | — | — | — | — | — | — | — | — | 70 |
| Liquidus temperature [° C.] | — | — | — | — | — | — | — | — | — | — | — | 814 |
| Liquidus viscosity (dPa·s) | — | — | — | — | — | — | — | — | — | — | — | 7.0 |
| Hydrolytic resistance test [μg/g] | 48.4 | 44.6 | 42.8 | 57.8 | 69.8 | — | — | — | — | — | — | 48.7 |
| Alkali resistance test (ISO695) [mg/dm²] | — | — | 58 | — | — | — | — | — | — | — | — | 49 |
| Acid resistance test (YBB00342004) [mg/dm²] | — | — | — | — | — | — | — | — | — | — | — | — |

TABLE 7

| mol % | No. 68 | No. 69 | No. 70 | No. 71 | No. 72 | No. 73 | No. 74 | No. 75 | No. 76 | No. 77 | No. 78 | No. 79 |
|---|---|---|---|---|---|---|---|---|---|---|---|---|
| $SiO_2$ | 71.2 | 75.2 | 73.2 | 75.0 | 75.0 | 73.6 | 73.6 | 76.7 | 75.7 | 75.7 | 75.7 | 76.5 |
| $Al_2O_3$ | 8.5 | 6.5 | 6.5 | 8.5 | 8.5 | 7.5 | 7.5 | 7.2 | 7.2 | 7.2 | 7.2 | 7.2 |
| $B_2O_3$ | 0.1 | 0.1 | 0.1 | 0.1 | 0.1 | 0.1 | 0.1 | 0.1 | 0.1 | 0.1 | 0.1 | 0.1 |
| $Li_2O$ | 6.1 | 6.1 | 6.1 | 6.1 | 7.1 | 6.1 | 9.1 | 4.1 | 4.1 | 5.1 | 3.1 | 4.3 |
| $Na_2O$ | 5.8 | 5.8 | 5.8 | 5.9 | 4.9 | 5.9 | 2.9 | 4.9 | 5.9 | 4.9 | 6.9 | 3.9 |
| $K_2O$ | 1.9 | 1.9 | 1.9 | 2.5 | 2.5 | 2.5 | 2.5 | 2.7 | 2.7 | 2.7 | 2.7 | 3.7 |
| MgO | 0.0 | 0.0 | 0.0 | 0.0 | 0.0 | 0.0 | 0.0 | 0.0 | 0.0 | 0.0 | 0.0 | 0.0 |
| CaO | 5.7 | 3.7 | 5.7 | 1.2 | 1.2 | 3.6 | 3.6 | 3.6 | 3.6 | 3.6 | 3.6 | 3.6 |
| SrO | 0.0 | 0.0 | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 | 0.0 | 0.0 |
| $ZrO_2$ | 0.5 | 0.6 | 0.5 | 0.5 | 0.5 | 0.5 | 0.5 | 0.5 | 0.5 | 0.5 | 0.5 | 0.5 |
| $SnO_2$ | 0.2 | 0.2 | 0.2 | 0.2 | 0.2 | 0.2 | 0.2 | 0.2 | 0.2 | 0.2 | 0.2 | 0.2 |
| $R_2O$ ($Li_2O + Na_2O + K_2O$) | 13.8 | 13.8 | 13.8 | 14.5 | 14.5 | 14.5 | 14.5 | 11.7 | 12.7 | 12.7 | 12.7 | 11.9 |
| R'O (MgO + CaO + SrO + BaO) | 5.7 | 3.7 | 5.7 | 1.2 | 1.2 | 3.6 | 3.6 | 3.6 | 3.6 | 3.6 | 3.6 | 3.6 |
| MgO/CaO | 0.00 | 0.00 | 0.00 | 0.00 | 0.00 | 0.00 | 0.00 | 0.00 | 0.00 | 0.00 | 0.00 | 0.00 |
| $CaO/Li_2O$ | 0.93 | 0.60 | 0.93 | 0.20 | 0.17 | 0.59 | 0.40 | 0.88 | 0.88 | 0.71 | 1.17 | 0.84 |
| $Li_2O/(Na_2O + K_2O)$ | 0.80 | 0.80 | 0.79 | 0.72 | 0.96 | 0.72 | 1.68 | 0.54 | 0.48 | 0.67 | 0.32 | 0.56 |
| $Al_2O_3/R_2O$ | 0.61 | 0.47 | 0.47 | 0.59 | 0.59 | 0.52 | 0.52 | 0.62 | 0.57 | 0.57 | 0.57 | 0.61 |
| Ps [° C.] | 504 | 485 | 491 | — | — | — | — | — | — | — | — | — |
| Ta [° C.] | 546 | 528 | 533 | — | — | — | — | — | — | — | — | — |
| Ts [° C.] | 763 | 753 | 745 | — | — | — | — | — | — | — | — | — |
| Working point ($10^{4.0}$ dPa·s) [° C.] | 1,149 | 1,159 | 1,128 | 1,235 | — | 1,164 | — | — | — | — | — | — |
| $10^{3.0}$ dPa·s [° C.] | 1,362 | 1,381 | 1,338 | — | — | — | — | — | — | — | — | — |
| Linear thermal expansion coefficient (20° C. to 300° C.) | 74 | 72 | 75 | — | — | — | — | — | — | — | — | — |
| Liquidus temperature [° C.] | 1,022 | 936 | 1,028 | — | — | — | — | — | — | — | — | — |
| Liquidus viscosity (dPa·s) | 4.8 | 5.5 | 4.6 | — | — | — | — | — | — | — | — | — |
| Hydrolytic resistance test [μg/g] | 64.2 | 63.9 | 80.0 | — | — | — | — | — | — | — | — | — |
| Alkali resistance test (ISO695) [mg/dm²] | — | 47 | 50 | — | — | — | — | — | — | — | — | — |
| Acid resistance test (YBB00342004) [mg/dm²] | — | — | — | — | — | — | — | — | — | — | — | — |

TABLE 8

| mol % | No. 80 | No. 81 | No. 82 | No. 83 | No. 84 | No. 85 | No. 86 | No. 87 | No. 88 | No. 89 | No. 90 | No. 91 |
|---|---|---|---|---|---|---|---|---|---|---|---|---|
| $SiO_2$ | 73.7 | 73.7 | 73.7 | 75.7 | 75.7 | 76.7 | 76.7 | 76.6 | 76.6 | 76.5 | 75.7 | 75.5 |
| $Al_2O_3$ | 7.2 | 7.2 | 7.2 | 7.2 | 7.2 | 7.2 | 7.2 | 7.3 | 7.2 | 7.3 | 7.2 | 7.3 |
| $B_2O_3$ | 0.1 | 0.1 | 0.1 | 0.1 | 0.1 | 0.1 | 0.1 | 0.1 | 0.1 | 0.1 | 0.1 | 0.1 |
| $Li_2O$ | 8.1 | 6.1 | 4.1 | 6.1 | 4.1 | 4.1 | 4.6 | 5.1 | 6.1 | 7.1 | 5.1 | 7.1 |
| $Na_2O$ | 3.8 | 5.8 | 7.8 | 3.8 | 5.8 | 4.8 | 4.3 | 3.8 | 2.9 | 1.9 | 4.8 | 2.9 |
| $K_2O$ | 2.7 | 2.7 | 2.7 | 2.7 | 2.7 | 2.7 | 2.7 | 2.7 | 2.7 | 2.7 | 2.7 | 2.7 |
| MgO | 0.0 | 0.0 | 0.0 | 0.0 | 0.0 | 0.0 | 0.0 | 0.0 | 0.0 | 0.0 | 0.0 | 0.0 |
| CaO | 3.7 | 3.7 | 3.7 | 3.7 | 3.7 | 3.7 | 3.7 | 3.7 | 3.7 | 3.7 | 3.7 | 3.7 |
| SrO | 0.0 | 0.0 | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 | 0.0 | 0.0 |
| $ZrO_2$ | 0.5 | 0.5 | 0.5 | 0.5 | 0.5 | 0.5 | 0.5 | 0.5 | 0.5 | 0.5 | 0.5 | 0.5 |
| $SnO_2$ | 0.2 | 0.2 | 0.2 | 0.2 | 0.2 | 0.2 | 0.2 | 0.2 | 0.2 | 0.2 | 0.2 | 0.2 |
| $R_2O$ ($Li_2O + Na_2O + K_2O$) | 14.6 | 14.6 | 14.6 | 12.6 | 12.6 | 11.6 | 11.6 | 11.6 | 11.7 | 11.7 | 12.6 | 12.7 |
| R'O (MgO + CaO + SrO + BaO) | 3.7 | 3.7 | 3.7 | 3.7 | 3.7 | 3.7 | 3.7 | 3.7 | 3.7 | 3.7 | 3.7 | 3.7 |
| MgO/CaO | 0.00 | 0.00 | 0.00 | 0.00 | 0.00 | 0.00 | 0.00 | 0.00 | 0.00 | 0.00 | 0.00 | 0.00 |
| $CaO/Li_2O$ | 0.46 | 0.61 | 0.90 | 0.61 | 0.90 | 0.90 | 0.80 | 0.73 | 0.61 | 0.52 | 0.73 | 0.52 |
| $Li_2O/(Na_2O + K_2O)$ | 1.25 | 0.72 | 0.39 | 0.94 | 0.48 | 0.55 | 0.66 | 0.78 | 1.09 | 1.54 | 0.68 | 1.27 |
| $Al_2O_3/R_2O$ | 0.49 | 0.49 | 0.49 | 0.57 | 0.57 | 0.62 | 0.62 | 0.63 | 0.62 | 0.62 | 0.57 | 0.57 |
| Ps [° C.] | 480 | 483 | 489 | 501 | 508 | 518 | 517 | 515 | 513 | 512 | 503 | 500 |
| Ta [° C.] | 523 | 526 | 533 | 547 | 553 | 566 | 564 | 562 | 560 | 559 | 549 | 545 |
| Ts [° C.] | 744 | 748 | 757 | 786 | 796 | 820 | 817 | 814 | 810 | 807 | 790 | 784 |
| Working point ($10^{4.0}$ dPa · s) [° C.] | 1,141 | 1,153 | 1,166 | 1,211 | 1,225 | 1,264 | 1,260 | 1,258 | 1,248 | 1,241 | 1,223 | 1,207 |
| $10^{3.0}$ dPa · s [° C.] | 1,361 | 1,374 | 1,390 | 1,442 | 1,458 | 1,504 | 1,498 | 1,494 | 1,484 | 1,476 | 1,455 | 1,437 |
| Hydrolytic resistance test [μg/g] | 62.0 | 63.9 | 68.8 | 43.4 | 47.7 | 41.2 | 41.2 | 41.5 | 40.6 | 40.7 | 47.1 | 45.0 |
| Acid resistance test (DIN12116) [mg/dm²] | — | — | — | — | — | — | — | — | — | — | — | — |
| Alkali resistance test (ISO695) [mg/dm²] | — | — | — | — | — | — | — | — | — | — | — | — |
| Linear thermal expansion coefficient (20° C. to 300° C.) | 72.4 | 76.1 | 79.3 | 67.7 | 71.6 | 67.0 | 66.1 | 65 | 62.9 | 60.6 | 69.4 | 65.2 |
| Liquidus temperature [° C.] | 919 | 914 | 925 | 964 | 982 | 999 | 1,017 | 995 | 990 | 960 | 995 | 955 |
| log η at TL | 5.6 | 5.7 | 5.7 | 5.7 | 5.6 | 5.7 | 5.5 | 5.7 | 5.7 | 5.9 | 5.5 | 5.7 |

TABLE 9

| mol % | No. 92 | No. 93 | No. 94 | No. 95 | No. 96 | No. 97 | No. 98 | No. 99 | No. 100 | No. 101 | No. 102 | No. 103 |
|---|---|---|---|---|---|---|---|---|---|---|---|---|
| $SiO_2$ | 76.9 | 76.9 | 78.4 | 79.9 | 79.9 | 79.9 | 79.9 | 79.4 | 78.9 | 78.3 | 78.7 | 77.9 |
| $Al_2O_3$ | 6.0 | 6.0 | 5.5 | 5.0 | 5.0 | 5.0 | 5.0 | 5.1 | 5.3 | 5.5 | 5.0 | 5.0 |
| $B_2O_3$ | 0.1 | 0.1 | 0.1 | 0.1 | 0.1 | 0.1 | 0.1 | 0.1 | 0.1 | 0.1 | 0.1 | 0.1 |
| $Li_2O$ | 6.1 | 8.1 | 7.1 | 6.1 | 6.1 | 4.8 | 3.5 | 5.0 | 5.1 | 5.3 | 5.1 | 6.1 |
| $Na_2O$ | 3.9 | 1.9 | 1.9 | 1.9 | 1.4 | 2.7 | 4.0 | 2.8 | 2.9 | 3.0 | 4.0 | 3.4 |
| $K_2O$ | 2.7 | 2.7 | 2.7 | 2.7 | 3.2 | 3.2 | 3.2 | 3.3 | 3.4 | 3.5 | 2.7 | 3.2 |
| MgO | 0.0 | 0.0 | 0.0 | 0.0 | 0.0 | 0.0 | 0.0 | 0.0 | 0.0 | 0.0 | 0.0 | 0.0 |
| CaO | 3.6 | 3.6 | 3.6 | 3.6 | 3.6 | 3.6 | 3.6 | 3.6 | 3.6 | 3.6 | 3.7 | 3.6 |
| SrO | 0.0 | 0.0 | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 | 0.0 | 0.0 |
| $ZrO_2$ | 0.5 | 0.5 | 0.5 | 0.5 | 0.5 | 0.5 | 0.5 | 0.5 | 0.5 | 0.5 | 0.5 | 0.5 |
| $SnO_2$ | 0.2 | 0.2 | 0.2 | 0.2 | 0.2 | 0.2 | 0.2 | 0.2 | 0.2 | 0.2 | 0.2 | 0.2 |
| $R_2O$ ($Li_2O + Na_2O + K_2O$) | 12.70 | 12.70 | 11.70 | 10.70 | 10.70 | 10.70 | 10.70 | 11.10 | 11.40 | 11.80 | 11.80 | 12.70 |
| R'O (MgO + CaO + SrO + BaO) | 3.60 | 3.60 | 3.60 | 3.60 | 3.60 | 3.60 | 3.60 | 3.60 | 3.60 | 3.60 | 3.70 | 3.60 |
| MgO/CaO | 0.00 | 0.00 | 0.00 | 0.00 | 0.00 | 0.00 | 0.00 | 0.00 | 0.00 | 0.00 | 0.00 | 0.00 |
| $CaO/Li_2O$ | 0.59 | 0.44 | 0.51 | 0.59 | 0.59 | 0.75 | 1.03 | 0.72 | 0.71 | 0.68 | 0.73 | 0.59 |
| $Li_2O/(Na_2O + K_2O)$ | 0.92 | 1.76 | 1.54 | 1.33 | 1.33 | 0.81 | 0.49 | 0.82 | 0.81 | 0.82 | 0.76 | 0.92 |
| $Al_2O_3/R_2O$ | 0.47 | 0.47 | 0.47 | 0.47 | 0.47 | 0.47 | 0.47 | 0.46 | 0.46 | 0.47 | 0.42 | 0.39 |
| Ps [° C.] | — | — | — | — | 517 | 516 | 518 | 511 | 508 | 506 | 499 | — |
| Ta [° C.] | — | — | — | — | 565 | 564 | 567 | 558 | 555 | 552 | 545 | — |
| Ts [° C.] | — | — | — | — | 824 | 824 | 826 | 813 | 806 | 803 | 789 | — |
| Working point ($10^{4.0}$ dPa · s) [° C.] | — | — | — | 1,258 | 1,268 | 1,268 | 1,270 | 1,249 | 1,242 | 1,231 | 1,214 | — |
| $10^{3.0}$ dPa · s [° C.] | — | — | — | 1,495 | 1,506 | 1,505 | 1,508 | 1,484 | 1,477 | 1,464 | 1,446 | — |
| Hydrolytic resistance test [μg/g] | 48.4 | 47.1 | 43.4 | 38.4 | 36.0 | 40.3 | 40.9 | 43.1 | 46.8 | 48.1 | 51.8 | — |
| Acid resistance test (DIN12116) [mg/dm²] | — | — | — | — | — | — | — | — | — | — | — | — |
| Alkali resistance test (ISO695) [mg/dm²] | — | — | — | — | — | — | — | — | — | — | — | — |
| Linear thermal expansion coefficient (20° C. to 300° C.) | — | — | — | — | — | — | — | — | 61.8 | 63.2 | 64.3 | 64.7 |
| Liquidus temperature [° C.] | — | — | 969 | 1,055 | 1,041 | 1,001 | 1,010 | 990 | 985 | 982 | 960 | — |
| log η at TL | — | — | — | 5.4 | 5.7 | 5.7 | 5.7 | 5.7 | 5.7 | 5.7 | 5.7 | — |

TABLE 10

| mol % | No. 104 | No. 105 | No. 106 | No. 107 | No. 108 |
|---|---|---|---|---|---|
| $SiO_2$ | 77.9 | 77.9 | 77.9 | 78.9 | 79.7 |
| $Al_2O_3$ | 5.0 | 5.0 | 5.0 | 5.3 | 5.0 |
| $B_2O_3$ | 0.1 | 0.1 | 0.1 | 0.1 | 0.1 |
| $Li_2O$ | 5.7 | 5.5 | 8.0 | 4.8 | 4.8 |
| $Na_2O$ | 3.2 | 4.4 | 2.0 | 2.7 | 2.7 |
| $K_2O$ | 3.8 | 2.8 | 2.7 | 3.9 | 3.6 |
| MgO | 0.0 | 0.0 | 0.0 | 0.0 | 0.0 |
| CaO | 3.6 | 3.6 | 3.6 | 3.6 | 3.4 |
| SrO | 0.0 | 0.0 | 0.0 | 0.0 | 0.0 |
| BaO | 0.0 | 0.0 | 0.0 | 0.0 | 0.0 |
| $ZrO_2$ | 0.5 | 0.5 | 0.5 | 0.5 | 0.5 |
| $SnO_2$ | 0.2 | 0.2 | 0.2 | 0.2 | 0.2 |
| $R_2O$ ($Li_2O + Na_2O + K_2O$) | 12.70 | 12.70 | 12.70 | 11.40 | 11.10 |
| R'O (MgO + CaO + SrO + BaO) | 3.60 | 3.60 | 3.60 | 3.60 | 3.40 |
| MgO/CaO | 0.00 | 0.00 | 0.00 | 0.00 | 0.00 |
| $CaO/Li_2O$ | 0.63 | 0.65 | 0.45 | 0.75 | 0.71 |
| $Li_2O/(Na_2O + K_2O)$ | 0.81 | 0.76 | 1.70 | 0.73 | 0.76 |
| $Al_2O_3/R_2O$ | 0.39 | 0.39 | 0.39 | 0.46 | 0.45 |
| Ps [° C.] | — | — | — | — | — |
| Ta [° C.] | — | — | — | — | — |
| Ts [° C.] | — | — | — | — | — |
| Working point ($10^{4.0}$ dPa·s) [° C.] | — | — | — | — | — |
| $10^{3.0}$ dPa·s [° C.] | — | — | — | — | — |
| Hydrolytic resistance test [μg/g] | — | — | — | 49.0 | 46.2 |
| Acid resistance test (DIN12116) [mg/dm²] | — | — | — | — | — |
| Alkali resistance test (ISO695) [mg/dm²] | — | — | — | — | — |
| Linear thermal expansion coefficient (20° C. to 300° C.) | — | — | — | — | — |
| Liquidus temperature [° C.] | — | — | — | 986 | 977 |
| log η at TL | — | — | — | — | — |

The samples were each prepared as described below.

First, 550 g of a batch was blended so as to give the composition shown in the table, and melted at 1,550° C. for 2.5 hours in a platinum crucible. In order to improve the homogeneity of the sample, the content was stirred twice in the course of melting. In order to further improve the homogeneity of the sample, the glass was once crushed with water and dried, and melted again at 1,550° C. for 1 hour in the platinum crucible, followed by being stirred once. In order to reduce bubbles in the sample, the content was melted at 1,600° C. for 2 hours. After the melting, an ingot was produced therefrom, and subjected to various evaluations after being processed into a shape required for measurement. The results are shown in Tables 1 to 7.

The strain point Ps was determined as a temperature at which the glass had a viscosity of $10^{14.5}$ Pa·s by a fiber elongation method in conformity with ASTM C336.

The annealing point Ta and the softening point Ts were each determined as a temperature at which the glass had a viscosity of $10^{7.6}$ Pa·s by a fiber elongation method in conformity with ASTM C388.

The working point (the temperature at which the glass had a viscosity of $10^{4.0}$ dPa·s) and the temperature at which the glass had a viscosity of $10^{3.0}$ dPa·s were each determined through measurement by a platinum sphere pull up method.

The linear thermal expansion coefficient was measured for the glass sample formed into a rod shape measuring about 5 mmφ by 20 mm within a temperature range of from 20° C. to 300° C. with a dilatometer.

The liquidus temperature was measured by filling the pulverized glass sample in a platinum boat measuring about 120 mm by about 20 mm by about 10 mm, and loading the platinum boat into an electric furnace having a linear temperature gradient for 24 hours. After that, a site at which a crystal precipitated was identified through observation with a microscope, a temperature corresponding to the site at which a crystal precipitated was calculated from a temperature gradient graph of the electric furnace, and the temperature was used as the liquidus temperature.

The liquidus viscosity was calculated as described below. A glass viscosity curve was determined from the strain point, the annealing point, the softening point, the working temperature, and a Fulcher viscosity calculation formula. The viscosity of the glass at the liquidus temperature was calculated based on the viscosity curve, and the viscosity was used as the liquidus viscosity.

The hydrolytic resistance test was performed as a hydrolytic resistance test (washing with acetone) in conformity with ISO 720. The detailed test procedures thereof are as described below. The glass sample was pulverized in an alumina motor with an alumina pestle, and classified into a particle diameter of from 300 μm to 425 μm with a sieve. The resultant powder was washed with acetone and dried in an oven at 140° C. 10 g of the powder sample after the drying was loaded in a quartz flask, 50 mL of purified water was further added thereto, and the flask was covered with a closure. The quartz flask including the sample was placed in an autoclave and subjected to treatment. The treatment conditions were as follows: a temperature was increased at a rate of 1° C./min from 100° C. to 121° C., was then retained at 121° C. for 30 minutes, and was reduced at a rate of 0.5° C./min to 100° C. The solution in the quartz flask was transferred to another beaker, the quartz flask was further washed with 15 mL of purified water three times, and also the washing liquid was added to the beaker. A methyl red indicator was added to the beaker, and the content was titrated with a 0.02 mol/L hydrochloric acid solution. An alkali elution amount was determined by converting the amount of the hydrochloric acid solution on the assumption that 1 mL of the 0.02 mol/L hydrochloric acid solution corresponded to 620 μg of $Na_2O$. The alkali elution amount was used as a measurement value for the hydrolytic resistance.

The alkali resistance of the glass was evaluated by a test in conformity with ISO 695.

The acid resistance of the glass was evaluated by an acid resistance test in conformity with YBB00342004.

As apparent from Tables 1 to 10, the glasses of Examples of the present invention each had a working point of 1,270° C. or less, and an alkali elution amount of 80.0 μg/g or less in the hydrolytic resistance test. As described above, in the present invention, the glass that is excellent in processability, and is also excellent in hydrolytic resistance can be obtained. In addition, it is conceived that the glass for a pharmaceutical container of the present invention, in which the content of $B_2O_3$ is restricted, hardly causes delamination. In addition, it is conceived that the glass for a pharmaceutical container of the present invention, in which the molar ratio MgO/CaO is restricted, hardly generates insoluble foreign matter resulting from a Mg ion eluted from the glass.

INDUSTRIAL APPLICABILITY

The glass for a pharmaceutical container of the present invention is suitable as a glass for manufacturing a pharmaceutical container, such as an ampoule, a vial, a pre-filled syringe, or a cartridge. In addition, the glass for a pharmaceutical container of the present invention is also applicable to a pharmaceutical container for oral drug pharmaceuticals, or a bottle for beverages.

The invention claimed is:

1. A glass for a pharmaceutical container, which comprises as a glass composition, in terms of mol %, 69% to 81% of $SiO_2$, 4% to 12% of $Al_2O_3$, 0% to 5% of $B_2O_3$, 5% to 20% of $Li_2O+Na_2O+K_2O$, 0% to 12% of $Li_2O$, 0% to 11% of $Na_2O$, 0.01% to 7.2% of MgO+CaO+SrO+BaO, and 0.01% to 7% of CaO, which satisfies the following relationship: a molar ratio MgO/CaO<1.0, and which has a working point of 1,270° C. or less.

2. The glass for a pharmaceutical container according to claim 1, wherein the glass for a pharmaceutical container has a content of $Li_2O$ of from 0.1 mol % to 12 mol %.

3. The glass for a pharmaceutical container according to claim 1, wherein the glass for a pharmaceutical container comprises as the glass composition, in terms of mol %, 0% to less than 4% of MgO, 1% to 4% of CaO, 0% to 4% of SrO, and 0% to 4% of BaO.

4. The glass for a pharmaceutical container according to claim 1, wherein the glass for a pharmaceutical container has a content of $B_2O_3$ of from 0.01 mol % to 4 mol %.

5. The glass for a pharmaceutical container according to claim 1, wherein the glass for a pharmaceutical container has a content of $Al_2O_3$ of from more than 8 mol % to 12 mol %.

6. The glass for a pharmaceutical container according to claim 1, wherein the glass for a pharmaceutical container has a content of MgO+CaO+SrO+BaO of from 1 mol % to 5 mol %.

7. The glass for a pharmaceutical container according to claim 1, wherein the glass for a pharmaceutical container has a value for a molar ratio $CaO/Li_2O$ of from more than 0 to 10,000.

8. The glass for a pharmaceutical container according to claim 1, wherein the glass for a pharmaceutical container has a value for a molar ratio $Li_2O/(Na_2O+K_2O)$ of from 0 to 4.0.

9. The glass for a pharmaceutical container according to claim 1, wherein the glass for a pharmaceutical container satisfies the following relationship: a molar ratio $Al_2O_3/(Li_2O+Na_2O+K_2O) \geq 0.52$.

10. The glass for a pharmaceutical container according to claim 1, wherein the glass for a pharmaceutical container has a working point of 1,260° C. or less.

11. The glass for a pharmaceutical container according to claim 1, wherein the glass for a pharmaceutical container is classified as at least HGA 1 in a hydrolytic resistance test (washing with acetone) in conformity with ISO 720.

12. The glass for a pharmaceutical container according to claim 1, wherein the glass for a pharmaceutical container has an alkali elution amount of 60 µg/g or less in a hydrolytic resistance test (washing with acetone) in conformity with ISO 720.

13. A glass tube for a pharmaceutical container, comprising the glass for a pharmaceutical container of claim 1.

14. A pharmaceutical container, comprising the glass for a pharmaceutical container of claim 1.

15. A glass for a pharmaceutical container, which comprises as a glass composition, in terms of mol %, 69% to 81% of $SiO_2$, 4% to 8% of $Al_2O_3$, 0% to 5% of $B_2O_3$, 5% to 16.4% of $Li_2O+Na_2O+K_2O$, 0.1% to 11% of $Na_2O$, 0.01% to 7.2% of MgO+CaO+SrO+BaO, and 0.01% to 4% of CaO, which satisfies the following relationship: a molar ratio MgO/CaO<1.0, which has a value for a molar ratio $CaO/Li_2O$ of from more than 0 to 10,000, and which has a working point of 1,270° C. or less.

16. The glass for a pharmaceutical container according to claim 15, wherein the glass for a pharmaceutical container has a working point of 1,260° C. or less.

17. A glass for a pharmaceutical container, which comprises as a glass composition, in terms of mol %, 69% to 81% of $SiO_2$, more than 8% to 12% of $Al_2O_3$, 0% to 5% of $B_2O_3$, 3.2% to 12% of $Li_2O$, 0.1% to 11% of $Na_2O$, 0.01% to 7.2% of MgO+CaO+SrO+BaO, and 0.01% to 7% of CaO, which satisfies the following relationship: a molar ratio MgO/CaO<1.0, and which has a value for $Al_2O_3/(Li_2O+Na_2O+K_2O)$ of from 0.52 to 1.10.

18. The glass for a pharmaceutical container according to claim 17, wherein the glass for a pharmaceutical container has a working point of 1,260° C. or less.

19. A glass for a pharmaceutical container, which comprises as a glass composition, in terms of mol %, 69% to 81% of $SiO_2$, 4% to 8% of $Al_2O_3$, 0% to 5% of $B_2O_3$, 5% to 14% of $Li_2O+Na_2O+K_2O$, 0.1% to 11% of $Na_2O$, 0.1% to 7.2% of MgO+CaO+SrO+BaO, and 0.1% to 4% of CaO, which satisfies the following relationship: a molar ratio MgO/CaO<1.0, which has a value for a molar ratio $CaO/Li_2O$ of from more than 0 to 10,000, and which has a value for a molar ratio $Al_2O_3/(Li_2O+Na_2O+K_2O)$ of from 0.3 to 0.5.

* * * * *